United States Patent
Nia et al.

(10) Patent No.: US 12,265,889 B2
(45) Date of Patent: Apr. 1, 2025

(54) SYSTEMATIC APPROACH FOR EXPLAINING MACHINE LEARNING PREDICTIONS

(71) Applicant: Oracle International Corporation, Redwood Shores, CA (US)

(72) Inventors: Karoon Rashedi Nia, Vancouver (CA); Tayler Hetherington, Vancouver (CA); Zahra Zohrevand, Vancouver (CA); Sanjay Jinturkar, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 925 days.

(21) Appl. No.: 17/083,148

(22) Filed: Oct. 28, 2020

(65) Prior Publication Data

US 2022/0129791 A1   Apr. 28, 2022

(51) Int. Cl.
*G06N 20/00* (2019.01)
*G06F 18/214* (2023.01)
(Continued)

(52) U.S. Cl.
CPC .......... *G06N 20/00* (2019.01); *G06F 18/214* (2023.01); *G06F 18/2411* (2023.01); *G06F 18/2414* (2023.01); *G06F 18/24323* (2023.01)

(58) Field of Classification Search
USPC .......................................................... 706/12
See application file for complete search history.

(56) References Cited

U.S. PATENT DOCUMENTS

| 11,853,853 B1 | 12/2023 | Beauchesne |
| 2019/0122135 A1 | 4/2019 | Parker |

(Continued)

OTHER PUBLICATIONS

Deep Hyperspherical Learning, arXiv.org, available at https://arxiv.org/pdf/1711.03189.pdf (Jan. 30, 2018).*

(Continued)

*Primary Examiner* — William L Bashore
*Assistant Examiner* — Conrad R Pack
(74) *Attorney, Agent, or Firm* — Hickman Becker Bingham Ledesma LLP

(57) ABSTRACT

A systematic explainer is described herein, which comprises local, model-agnostic, surrogate ML model-based explanation techniques that faithfully explain predictions from any machine learning classifier or regressor. The systematic explainer systematically generates local data samples around a given target data sample, which improves on exhaustive or random data sample generation algorithms. Specifically, using principles of locality and approximation of local decision boundaries, techniques described herein identify a hypersphere (or data sample neighborhood) over which to train the surrogate ML model such that the surrogate ML model produces valuable, high-quality information explaining data samples in the neighborhood of the target data sample. Combining this systematic local data sample generation and a supervised neighborhood selection approach to weighting generated data samples relative to the target data sample achieves high explanation fidelity, locality, and repeatability when generating explanations for specific predictions from a given model.

24 Claims, 11 Drawing Sheets

(51) Int. Cl.
   *G06F 18/2411* (2023.01)
   *G06F 18/2413* (2023.01)
   *G06F 18/243* (2023.01)

(56) References Cited

U.S. PATENT DOCUMENTS

| | | | |
|---|---|---|---|
| 2019/0197357 A1 | 6/2019 | Anderson et al. | |
| 2019/0303719 A1* | 10/2019 | Hamilton | G06F 16/906 |
| 2020/0110982 A1* | 4/2020 | Gou | G06N 3/088 |
| 2020/0193309 A1 | 6/2020 | Hazard | |
| 2021/0049503 A1 | 2/2021 | Nourian | |
| 2021/0142190 A1 | 5/2021 | Isahagian | |
| 2022/0019900 A1 | 1/2022 | Wong | |
| 2022/0188645 A1 | 6/2022 | Nia et al. | |
| 2022/0198277 A1 | 6/2022 | Nia et al. | |
| 2022/0309360 A1 | 9/2022 | Zohrevand et al. | |
| 2022/0335255 A1 | 10/2022 | Zohrevand et al. | |
| 2022/0366297 A1 | 11/2022 | Pushak et al. | |

OTHER PUBLICATIONS

Laugel et al., Defining Locality for Surrogates in Post-hoc Interpretablity, arXiv.org, available at https://arxiv.org/pdf/1806.07498.pdf (Jun. 19, 2018).*
Molnar et al., Limitations of Interpretable Machine Learning Methods, available at https://slds-lmu.github.io/iml_methods_limitations/ (Oct. 5, 2020).*
Ruff et al., Deep One-Class Classification, International Conference on Machine Learning, pp. 4393-4402, available at https://ls9-www.cs.tu-dortmund.de/publications/ICML2018.pdf (2018).*
Saito et al., Improving LIME Robustness with Smarter Locality Sampling, arXiv.org, available at https://arxiv.org/pdf/2006.12302v2.pdf (revised Jul. 24, 2020).*
Sood, Akshay, et al., "Feature Importance Explanations for Temporal Black-Box Models", Cornell Univ Library, XP81891289, https://arxiv.org/abs/2102.11934v1, Feb. 23, 2021, 13 pages.
Current Claims in International Application No. PCT/US2023/015746, dated Mar. 21, 2023, 3 pages.
Au, Quay, et al., "Grouped Feature Importance and Combined Features Effect Plot", Cornell Univ Library, XP81943563, https://arxiv.org/abs/2104.11688v1, Apr. 23, 2021, 43 pages.
SciPy.Org, Statistical Functions (scipy.stats), https://docs.scipy.org/doc/scipy-1.5.0/reference/stats.html, SciPy v1.5.0, dated Jun. 2020, 9 pages.
Plumb et al., "Model Agnostic Supervised Local Explanations", 32nd Conference on Neural Information Processing Systems (NeurIPS 2018), dated 2018, Montréal, Canada, 10 pages.
Dhurandhar et al., "Explanations based on the Missing: Towards Contrastive Explanations with Pertinent Negatives", dated 2018, 12 pages.
Egan et al., "Generalized Latent Variable Recovery for Generative Adversarial Networks", dated Oct. 19, 2018, 9 pages.
Github.com, "slundberg/shap", https://github.com/slundberg/shap/blob/master/shap/explainers/_permutation.py, updated on Nov. 17, 2020, 5 pages.
Goodfellow et al., "Generative Adversarial Nets", dated 2014, 9 pages.
Heusel et al., "GANs Trained by a Two Time-Scale Update Rule Converge to a Local Nash Equilibrium", 31st Conference on Neural Information Processing Systems (NIPS 2017), Long Beach, CA, USA, 12 pages.
Laugel et al., "Comparison-based Inverse Classification for Interpretability in Machine Learning"., (IPMU 2018), dated Jun. 2018, Cadix, Spain, 12 pages.
Laugel et al., "Defining Locality for Surrogates in Post-hoc Interpretablity", dated Jun. 19, 2018 ICML Workshop on Human Interpretability in Machine Learning (WHI 2018), 7 pages.
Lipton et al., "Precise Recovery of Latent Vectors From Generative Adversarial Networks", Workshop track—ICLR dated Feb. 17, 2017, 4 pages.

Bloniarz et al., "Supervised Neighborhoods for Distributed Nonparametric Regression", Proceedings of the 19th International Conference on Artificial Intelligence and Statistics dated 2016, 10 pages.
Pedregosa et al., "Scikit-learn: Machine Learning in Python", Journal of Machine Learning Research 12, dated 2011, 6 pages.
Zhao et al., "Data-driven risk-averse stochastic optimization with Wasserstein metric", Operations Research Letters, dated 2018, 6 pages.
Ribeiro et al., "Why Should I Trust You?" Explaining the Predictions of Any Classifier, KDD dated 2016 San Francisco, CA, USA, 10 pages.
Roth, Alvin, "The Shapley Value", Essays in honor of Lloyd S. Shapley, Cambridge University Press, dated 1988, 338 pages.
Strumbelj et al., "An Efficient Explanation of Individual Classifications Using Game Theory", Journal of Machine Learning Research 11, dated 2010, 18 pages.
Strumbelj et al., "Explaining Prediction Models and Individual Predictions with Feature Contributions." Knowledge and information systems 41.3, dated Aug. 2013, pp. 647-665.
Sweke et al., "On the Quantum versus Classical Learnability of Discrete Distributions", dated Jul. 28, 2020, 27 pages.
Van Looveren et al., "Interpretable Counterfactual Explanations Guided by Prototypes", dated Feb. 18, 2020, 17 pages.
Vanschoren et al., "OpenML: Networked Science in Machine Learning", dated Aug. 1, 2014, 12 pages.
Wachter et al., "Counterfactual Explanations Without Opening The Black Box: Automated Decisions and The GDPR", dated 2017, 52 pages.
Xu et al., "Modeling Tabular Data using Conditional GAN", 33rd Conference on Neural Information Processing Systems (NeurIPS 2019), dated 2019, Vancouver, Canada, 11 pages.
Lundberg et al., "A Unified Approach to Interpreting Model Predictions", 31st Conference on Neural Information Processing Systems (NIPS 2017), dated 2017, Long Beach, CA, USA, 10 pages.
Ribeiro et al., "Why Should I Trust You? Explaining the Predictions of Any Classifier", In Proceedings of the 22nd ACM SIGKDD International Conference on Knowledge Discovery and Data Mining, dated Aug. 2016, 10 pages.
Rdrr.io, "Plot_Superpixels: Test Super Pixel Segmentation", https://rdrr.io/cran/lime/man/plot_superpixels.html, dated Feb. 24, 2022, 2 pages.
Pope et al., "Explainability Methods for Graph Convolutional Neural Networks", In Proceedings of the IEEE/CVF Conference on Computer Vision and Pattern Recognition, dated 2019, 10 pages.
Petkovic et al., "Improving the Explainability of Random Forest Classifier—User Centered Approach", Proceedings of the Pacific Symposium on Biocomputing, https://www.worldscientific.com/doi/pdf/10.1142/9789813235533_0019, dated 2018, 12 pages.
Montavon et al., "Explaining Nonlinear Classification Decisions with Deep Taylor Decomposition", Pattern Recognition, vol. 65, https://www.sciencedirect.com/science/article/pii/S0031320316303582, dated May 2017, 12 pages.
Lundberg et al., "A Unified Approach to Interpreting Model Predictions", 31st Conference on Neural Information Processing Systems, https://proceedings.neurips.cc/paper/2017/file/8a20a8621978632d76c43dfd28b67767-Paper.pdf, dated 2017, 10 pages.
Bach et al., "On Pixel-Wise Explanations for Non-Linear Classifier Decisions by Layer-Wise Relevance Propagation", PloS one, https://journals.plos.org/plosone/article?id=10.1371/journal.pone.0130140, dated Jul. 10, 2015, 46 pages.
Thibault Laugel. Local post-hoc interpretability for black-box classifiers. Machine Learning [cs.LG]. Sorbonne Universite, 2020 (Year: 2020).
Lahiri A, Edakunni NU. Accurate and Intuitive Contextual Explanations using Linear Model Trees. arXiv preprint arXiv: 2009.05322. Sep. 11, 2020, originally presented at KDD Workshop on ML in Finance 2020, Aug. 24, 2020 (Year: 2020).
Guidotti R, Monreale A, Ruggieri S, Pedreschi D, Turini F, Giannotti F. Local rule-based explanations of black box decision systems. arXiv preprint arXiv:1805.10820. May 28, 2018 (Year: 2018).

(56) References Cited

OTHER PUBLICATIONS

Vlassopoulos G. et al., "Explaining predictions by approximating the local decision boundary", arXiv preprint arXiv:2006.07985. (Jun. 14, 2020).

Carbonero-Ruz, M. et al., "A two dimensional accuracy-based measure for classification performance". Information Sciences, 382, 60-80. (Year: 2016).

Amer, A. A., et al., "A set theory based similarity measure for text clustering and classification". Journal of Big Data (2020).

* cited by examiner

SYSTEMATIC APPROACH FOR EXPLAINING MACHINE LEARNING PREDICTIONS

FIELD OF THE INVENTION

The techniques described herein relate to using surrogate machine learning models to explain results of more complex machine learning models, and, more specifically, to systematically identifying a training data set to train a surrogate machine learning model such that explanations derived from the surrogate model for specific predictions, from a complex machine learning model, have high explanation fidelity, locality, and repeatability.

BACKGROUND

Machine learning and deep learning are becoming ubiquitous for two main reasons: (1) the ability of machine learning to solve complex problems in a variety of different domains, and (2) the growth in the performance and efficiency of modern computing resources to support machine learning. Deep learning algorithms are machine learning algorithms, such as neural networks, that allow for more complex analysis of inputs than traditional machine learning algorithms. However, as the complexity of problems increases, so too does the complexity of the machine learning models applied to solve these problems.

Deep learning is a prime example of this trend. Traditional machine learning algorithms, such as neural networks, generally only contain a few layers of densely connected neurons. In contrast, deep learning algorithms, such as convolutional neural networks, may contain tens to hundreds of layers of neurons performing vastly different operations. Increasing the depth of a machine learning model and the heterogeneity of layers of the model provides many benefits. For example, going deeper can increase the capacity of the model, improve the generalization of the model, and provide opportunities for the model to filter out unimportant features. Including layers that perform different operations can greatly improve the performance of the model.

While it is important for a machine learning model to have high prediction accuracy, many times, it is equally important for a user to be able to understand why the model made a given prediction. For example, consider a machine learning task used to predict whether a patient requires a specific medication given input features about the patient's health and history. In such a case, it is important to understand why the machine learning model made a given prediction in order for a doctor to trust the model. Furthermore, recent laws, such as the European Union's "right to an explanation", require that people be provided with an explanation for a decision of a prediction algorithm (e.g., a machine learning task) that has an effect on them. Thus, it is important to be able to understand why a machine learning model makes a given prediction for machine learning to be useful in various aspects of society.

Enhancements in machine and deep learning algorithms can come at the cost of increased complexity and reduced interpretability of the resulting predictions. For example, given the complexity of deep machine learning models, explaining and interpreting the results from deep machine learning (ML) models is a challenging task compared to producing explanations for many traditional ML models that are less complex. Consider a simple linear regression ML model with N input features. Once trained, the resulting model is simply a dot product of the N-dimensional data sample feature vector, x, and the learned model weights, m, along with an offset, b, as depicted in the following Function 1.

$$f(x)=\Sigma_{i=0}^{N-1} m_i x_i + b \quad \text{(Function 1)}$$

Based on Function 1, understanding the importance of features of the model and how the features contribute to the model's predictions is straightforward: the larger the feature weight, the larger the impact that feature has on the output of the model.

As another example, consider a binary classification decision tree with N input features. During model training, features that have the largest impact on the class predictions are inserted near the root of the decision tree, while features that have less impact on class predictions fall near the leaves of the tree. The importance of a given feature to predictions from such a model can be determined by evaluating (a) the distance of a node (corresponding to the feature and value that maximizes the class split at the node) to the root of the tree, and (b) the ability for this feature to split the class space (impurity).

Less-complex ML models, such as the simple linear regression model and the classification decision tree, are often referred to as being inherently interpretable. However, as the complexity of ML models increase (e.g., the number of features or depth of the decision tree increases), it becomes increasingly challenging to interpret the results of the model. Further, even relatively simple neural networks with a few layers can be challenging to interpret, as multiple layers combine the effects of features and increase the number of operations between the model inputs and outputs. Consequently, there is a requirement for techniques to aid with the interpretation of complex machine learning and deep learning models.

Machine learning explainability (MLX) is the process of explaining and interpreting machine learning and deep learning models. MLX can be broadly categorized into local and global explainability. Local MLX explains why an ML model made a specific prediction corresponding to a given data sample. In other words, local MLX answers the question: "why did a particular ML model make a specific prediction?" Global MLX explains the general behavior of an ML model as a whole. In other words, global MLX answers the question: "how does a particular ML model work?" or "what did a particular ML model learn from the training data?"

For both local and global explainability, MLX techniques can further be classified as model-agnostic or model-specific. For model-agnostic MLX, the explanations are separated from the underlying ML model being explained, treating the model as a black box. For model-specific MLX, the explanations are tied to the architecture and/or properties of the underlying ML model.

There are many different explanation techniques for each combination of local/global and model-agnostic/model-specific explanations. Descriptions herein focus on the specific class of local, model-agnostic MLX. The following provides some relevant background information on explanation techniques and discusses challenges and limitations.

Local, Model-Agnostic, Surrogate-Model Explanation Techniques

One class of local, model-agnostic explainers use an external, inherently interpretable surrogate ML model (such as a linear regression model or a decision tree) to explain the local behavior of complex machine learning and deep learning models (referred to as black-box ML models). Locality here is defined relative to the data sample for which a prediction, produced by a black-box ML model, is being explained (referred to herein as the "target data sample").

In such explainers, the interpretable surrogate ML model is used to approximate the local behavior of the black-box ML model. If a surrogate ML model accurately approximates the local behavior of a complex black-box ML model, the feature importance from the surrogate ML model can be used to estimate the feature importance of the original black-box ML model for the target data sample. The resulting explanation includes the relative feature importance order and weights indicating the relative levels of importance. The key insight from these explainers is that while the global black-box ML model behavior may be far too complex to approximate with a simple interpretable model, the local behavior of the black-box ML model may be much easier to approximate. Examples of local surrogate ML model explainers include LIME, MAPLE, and LS, as described in further detail below.

The Lime Explainer

The LIME explainer (referred to herein as "LIME") is described in the following reference: Ribeiro, Marco Tulio, Sameer Singh, and Carlos Guestrin. "Why should I trust you?: Explaining the predictions of any classifier." Proceedings of the 22nd ACM SIGKDD International Conference on Knowledge Discovery and Data Mining; ACM, 2016, the entire contents of which are hereby incorporated by reference as if fully set forth herein. LIME applies a straightforward technique by presuming that complex ML models behave linearly in local neighborhoods. To this end, LIME randomly generates a sample feature space using the training data set features, weights the samples based on distance to the target data sample, and fits a linear regression model on the resulting set of data samples.

Although LIME is computationally feasible to provide local explanations, its data sample generation approach suffers from many limitations. LIME generates a large local data sample feature space around the target data sample by adding random noise using a normal distribution, $N(\mu=0, \sigma=1)$, to the target data sample. For categorical or discretized features, data samples are generated based on the frequency of feature values in the training data. As such, LIME may violate the locality property. Specifically, randomly-generated features can result in (a) data samples that are very far away, within the data sample feature space, from the target data sample, and (b) data samples that are unrealistic. For example, randomly and independently selecting feature values can break feature correlations present in the original data sample set.

Furthermore, the generated data samples may not effectively cover the prediction boundaries of the black-box ML model, or complexities of predictions by the black-box ML model around the target data sample that are responsible for the prediction being explained. Also, the distribution of features in the generated data samples may not resemble the feature distributions of the training data. Thus, explanations produced by LIME for a given prediction may vary widely depending on the generated training data set and may not accurately represent the local behavior of the complex black-box ML model, lowering confidence in the explanations.

Furthermore, LIME weights the randomly generated data samples using a Euclidean-based kernel distance function to measure the distance between a generated data sample and the target data sample. This technique has two main problems. First, because the randomly generated data samples may be very far away from the target data sample, the kernel distance function can result in large number of near-zero valued weights, which reduces the quality of data used to fit the surrogate ML model. Second, the distance kernel function contains a kernel width parameter, which requires careful tuning to obtain the best explanation. Specifically, different values of the kernel width parameter can result in significantly different explanations, which further lowers confidence in the explanations.

The Maple Explainer

The MAPLE explainer (referred to herein as "MAPLE") is described in the following reference: Plumb, Gregory, Denali Molitor, and Ameet S. Talwalkar. "Model Agnostic Supervised Local Explanations." Advances in Neural Information Processing Systems; 2018, the entire contents of which are hereby incorporated by reference as if fully set forth herein. In a manner similar to LIME, MAPLE trains an inherently interpretable surrogate ML model to fit on the black-box ML model's predictions for a local data sample feature space around the target data sample. However, MAPLE suffers from problems with explanation quality, locality, and repeatability.

Unlike LIME, which randomly generates the local data samples, the local data sample feature space in MAPLE is selected from the training data through a supervised approach. The technique utilizes a forest ensemble (e.g., random forest model) to weight the training data based on how frequently each training data point is in the same leaf node as the target data sample through the trees of the forest ensemble. This technique improves performance over LIME because data sample generation is replaced by a data sample selection algorithm from the training data. While this resolves the issue with unrealistic data samples in LIME, the evaluation of the black-box ML model is limited to data over which the black-box ML model was trained. This reduces the information that can be extracted about the black-box ML model's local behavior because the data that has previously been seen by the black-box ML model may not cover the data space thoroughly, which prevents the surrogate ML model trained on the previously-seen subset of data from accurately representing the behavior of the black-box ML model in the full data sample feature space. Consequently, as with LIME, explanations from MAPLE may not accurately represent the local behavior of the complex black-box ML model, lowering confidence in the explanation.

The LS Explainer

The LS explainer (referred to herein as "LS") is described in the following reference: Laugel, Thibault, et al. "Defining locality for surrogates in post-hoc interpretability." arXiv preprint arXiv:1806.07498 (2018), the entire contents of which are hereby incorporated by reference as if fully set forth herein. LS proposes improvements over LIME. Specifically, LS generates a data sample feature space around the decision boundary relevant to the target prediction label for the target data sample versus a disparate class label. LS employs a growing sphere algorithm, which identifies the closest data sample that belongs to a different target class than the target data sample as the classification border. Unlike LIME, which centers the generated data samples around the target data sample, LS centers the generated data samples around this classification border.

There are some deficiencies with the LS technique. For example, the growing sphere algorithm is not guaranteed to find a solid decision boundary, as the technique only considers the closest data sample from a different target class to be the decision boundary of the black-box ML model. While this data sample is indeed an example of where the model predicts a different class, the prediction for this data sample could instead be related to noise resulting from the LS random data sample generation approach. For example, there could be multiple classification borders around the target data sample. The approach presented in LS would only find the first border (based on the generated data samples), and may miss important information indicating the actual reasons behind the black-box ML model's predictions (i.e., the first identified classification border may not be the most important, or even relevant to the data sample being explained).

Furthermore, the idea of shifting the center for generated data samples from the target data sample to the classification border may result in a local neighborhood that is entirely different from that of the original data sample. This can occur, for example, if the target data sample is located very far away from the black-box decision boundaries. It is worth noting that the LS technique is only applicable to classification tasks.

Shapley Value-Based Explanation Techniques

Another approach to local model explainability is coalitional game theory. Coalitional game theory formally defines a game with N players and computes the total payoff that the coalition members (players) can achieve for some target. Shapley values (described in Shapley, Lloyd S. "A value for n-person games." Contributions to the Theory of Games 2.28 (1953): 307-317, the entire contents of which are hereby incorporated by reference as if fully set forth herein) uniquely specify how to split the total payoff (output) fairly among the players (inputs), while satisfying the rules of the game. This problem is different from simply dividing the reward based on each player's value (weight) because interactions between players and the order in which they play the game may affect each player's contribution toward the reward. Shapley values obtain each player's actual contribution by averaging the payoffs with and without this player for all of the possible coalitions that can be formed. Thus, the number of possible coalition combinations grows exponentially with the number of players in a game, which can limit the feasibility of using such a technique.

Relating game theory and Shapley values to MLX, there are different features (players) contributing to the machine learning model's output (payoff), and the goal is to compute the feature attributions (player rewards), while also considering feature interactions. There are multiple different techniques for computing or approximating Shapley Values in the context of MLX, such as: (a) Kernel SHAP, which expands on LIME to compute Shapley Values using a specific weighted linear regression (not a surrogate ML model); or (b) approximation methods to improve runtime performance, such as a sampling-based approach using Monte Carlo sampling or a permutation-based approach that permutates the feature values.

To evaluate the contribution of each feature's value in the target data sample, Kernel SHAP generates new data samples by trying all possible combinations of feature values. Consequently, the explanation runtime grows exponentially with the number of features. This behavior becomes prohibitively expensive in high dimensional datasets, which are common in many real-world problems.

Kernel SHAP generates a data sample feature space by partially perturbing the feature values of the target data sample; it substitutes a subset of feature values with the possible values in the training set, while keeping the values of the rest of the features unchanged. There are several drawbacks with this approach. Specifically, substituting the feature values with all previously observed values in the training data may violate the locality assumption (data samples are not guaranteed to be close to the target data sample). Also, the quality of the generated data sample feature space is highly dependent on the comprehensiveness of the training dataset.

Furthermore, unlike surrogate-model based techniques, which approximate the local behavior around the target data sample, Shapley-value based techniques only provide the feature importance for the specific target data sample. Consequently, the resulting explanation cannot be used to estimate what might happen if a given feature value is slightly increased or decreased.

The above-indicated challenges limit the practicality of using existing MLX techniques.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

Figure 1:
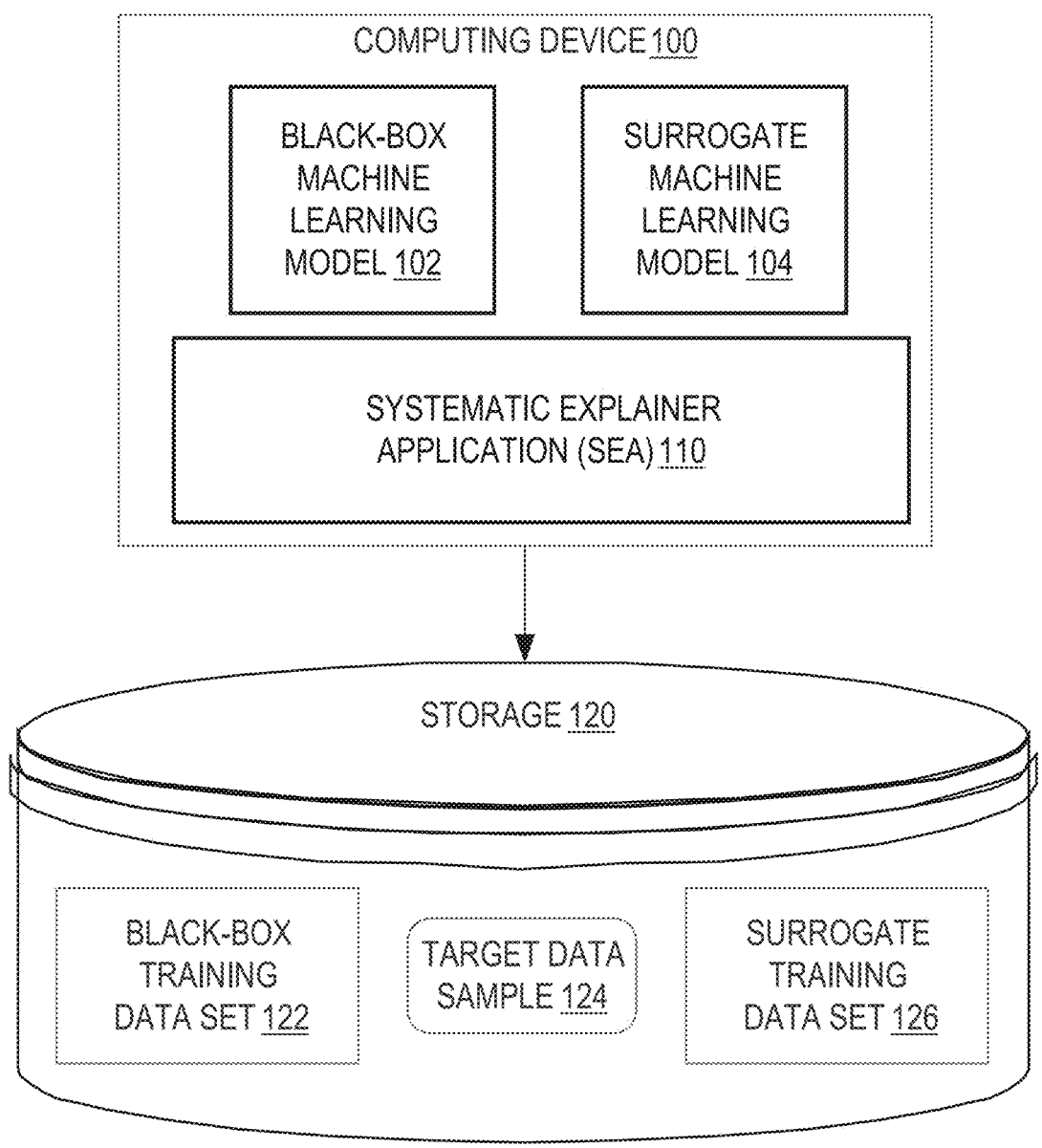
FIG. 1 depicts a block diagram of an example computing device running a systematic explainer application that produces local, model-agnostic data sample explanations.

In the following description, for the purposes of explanation, numerous specific details are set forth in order to provide a thorough understanding of the techniques described herein. It will be apparent, however, that the techniques described herein may be practiced without these specific details. In other data samples, well-known structures and devices are shown in block diagram form in order to avoid unnecessarily obscuring the techniques described herein.

General Overview

A systematic explainer is described herein, which comprises local, model-agnostic, surrogate ML model-based explanation techniques that faithfully explain predictions from any machine learning classifier or regressor. Herein, references to machine learning models also refer to deep learning models unless otherwise indicated. The systematic explainer systematically generates local data samples around a given target data sample, which improves on exhaustive or random data sample generation algorithms. Combining this systematic local data sample generation and a supervised neighborhood selection approach to weighting generated data samples relative to the target data sample achieves high explanation fidelity, locality, and repeatability when generating explanations for specific predictions from a given model.

Techniques described herein provide four main improvements over prior industry solutions, including locality, approximation of local decision boundaries, approximation of feature distributions, and fidelity and repeatability. Using principles of locality and approximation of local decision boundaries, techniques described herein identify a hypersphere (or data sample neighborhood) over which to train the surrogate ML model such that the surrogate ML model produces valuable, high-quality information explaining data samples in the neighborhood of the target data sample.

For the explanation to be useful, the explanation should faithfully explain the behavior of the machine learning model in the vicinity of the target data sample (explanation quality), should be repeatable, and should be practical to compute. Higher explanation quality helps to better understand the actual behavior of the black-box ML model, which in turn increases trust in the model. Repeatability ensures that the explanation technique generates the same explanation for the same target data sample, which is necessary to trust the explanation technique.

Locality: Feature importance varies in different regions of the feature space based on the features' values. Considering a specific target data sample, particular features may be more or less important depending on their values and, at times, depending on the values of other features co-occurring with the particular feature values. For a local explanation to be meaningful, the explanation should accurately represent the behavior of the black-box ML model in the neighborhood of interest (i.e., locality). If an explanation of a result for a particular data sample is produced based on the behavior of the model in a neighborhood that is far from the point of interest, the locality property is violated. Techniques described herein ensure locality by training the surrogate ML model on data samples that are guaranteed to be in the local neighborhood of the target data sample. This locality guarantee results in data samples that thoroughly populate the local neighborhood of the target data sample, which ensures that the behavior of the black-box ML model is exercised in the local vicinity around the data sample of interest.

Approximation of local decision boundaries: While high locality is an important property of quality local explanations, evaluating the local behavior of the black-box ML model with too high locality may not sufficiently exercise the local behavior of the black-box ML model. For example, if all of the generated data samples are so close to the target data sample that the predictions from the black-box ML model do not change, the surrogate explainer model will not be able to extract any useful information from the black-box ML model's behavior (since changes in feature values do not result in a change in the model's output). The systematic explainer techniques described herein cause the surrogate ML model to be trained on data samples that (a) are close to the target data sample (high locality) and (b) sufficiently exercise the black-box ML model's local behavior (i.e., the surrogate ML model training data reflects one or more changes in the predictions of the black-box ML model).

Approximation of feature distributions: If data samples in the training data set of the surrogate ML model differ significantly from the data samples used to train the black-box ML model, the resulting prediction explanations may not be representative of the actual local behavior of the black-box ML model (i.e., the model output may not be valid for unexpected or improbable combinations of input feature values). Consequently, the explanations may be misleading, focusing on parts of the black-box ML model's behavior that likely will never occur under normal operation. Thus, once the systematic explainer defines a local region around a target data sample (with high locality that sufficiently exercises the black-box ML model's behavior), data samples are generated within this local region by assigning values to each feature that follow similar feature distributions as are found in the training data used to train the black-box ML model. Thus, the surrogate ML model is trained on data that resembles the data that the black-box ML model was trained on without restricting the training data set of the surrogate ML model to data in the training data set of the black-box ML model.

Fidelity and repeatability: The ultimate goal of local MLX is to closely approximate the local behavior of the trained black-box ML model (i.e., fidelity). Additionally, the explanation generated for a given target data sample should be repeatable. Based on experiments across twenty different classification and regression datasets, techniques described herein significantly improve local explanation fidelity and repeatability when compared to prior industry solutions. The novel systematic data sample generation approaches described herein play a significant role in approximating the local behavior of the black-box ML model in a faithful manner. Specifically, the extent of the data sample generation neighborhood is defined in a way that includes the black-box boundaries/complexities surrounding the target data sample that affect the predictions, while remaining strictly local to the target data sample. The data samples generated by the systematic approach resemble the actual training data that the black-box ML model is trained on, which also improves the fidelity of the explanations derived from the surrogate ML model.

Because the explanations are based on surrogate ML models that are trained on training data sets produced according to the systematic data sample generation approaches described herein, the results are inherently repeatable given that they faithfully represent the behavior of the respective black-box ML models. The reason that the surrogate ML model, being trained on a training data set generated according to techniques described herein, is more faithful to the behavior of the black-box model (compared to a model trained based on random sample generation) is that the systematic sample generation thoroughly covers (a) the local neighborhood of the target data sample, and (b) the black-box boundaries/complexities surrounding the target data sample. This thorough coverage mitigates the effect of randomness and makes the results repeatable. Random sample generation may miss some corners of the local neighborhood due to its randomness factor and also may generate data samples that are far away from the target data sample in the feature space, producing unstable results (i.e., explanations that may change from run to run). In contrast, since techniques described herein systematically define the local boundaries where the surrogate model training data is generated and selected from the existing training data, training data sets that include systematically-generated samples tend to cover the same parts of the region between runs even though many of the samples themselves may be different between runs. Thus, the main reason for improved repeatability is due to the systematic approach for sample generation, which is inherently more repeatable than approaches that rely on random sample generation.

Because results are inherently repeatable, only one run of the systematic explainer is required to produce a surrogate ML model on which to base an explanation for a target data sample result, where a user may have confidence that an additional run will not change the produced explanation. With explainers that produce different explanations across different runs, to get a more accurate result and increase confidence in the final result, one could (and probably should) run these explainers multiple times per target data sample and average the results to capture and mitigate variance in the resulting explanations.

Furthermore, in certain circumstances described in further detail below, a trained surrogate ML model may be used to produce an explanation for another target data sample prediction from the black-box model. This ability to reuse a surrogate ML model eliminates the need to train a surrogate ML model for the second target data sample.

Along with the novel data sample generation techniques described herein, techniques described herein exploit a supervised neighborhood selection approach to improve the weighting of generated data samples relative to the target data sample. Experiments show that the combination of these techniques produces a high fidelity of the surrogate ML model to the black-box ML model, with results that are repeatable.

Furthermore, embodiments described herein are computed efficiently, even as the data sample size or feature set grows. Specifically, the runtime of explanation techniques described herein grows linearly with the number of features, compared to the exponential growth with respect to the number of features in the dataset, as seen in exhaustive search-based techniques such as Kernel SHAP. Thus, the systematic explainer described herein is able to produce high-quality prediction explanations, without requiring exhaustive search, with linear growth instead of exponential growth in runtime with respect to the number of features in the dataset. Consequently, the described explanation techniques improve computing performance for local, model-agnostic MLX over prior solutions.

According to an embodiment, the number of generated data samples is a configurable constant or is determined linearly based on the number of features in the feature space, which also increases the predictability of runtime requirements.

Systematic Explainer Application

FIG. 1 depicts a block diagram of an example computing device 100 running a systematic explainer application (SEA) 110 that produces explanations for specific predictions (i.e., local MLX) from any machine learning classifier or regressor (i.e., model-agnostic), according to techniques described herein. Computing device 100 is communicatively connected to persistent storage 120, which includes training data sets 122 and 126, each comprising a plurality of data samples. Storage 120 also stores one or more data samples, including target data sample 124, over which an ML model (such as black-box ML model 102) is run. Techniques are described herein in the context of tabular data, which comprises values with associated labels, such as column-based data, key/value pair-based data, or attribute and attribute value-formatted data. Nevertheless, according to one or more embodiments, the data samples stored in storage 120 may be formatted in any way, including as graph data, relational data, Resource Description Framework (RDF) data, etc.

Figure 2:
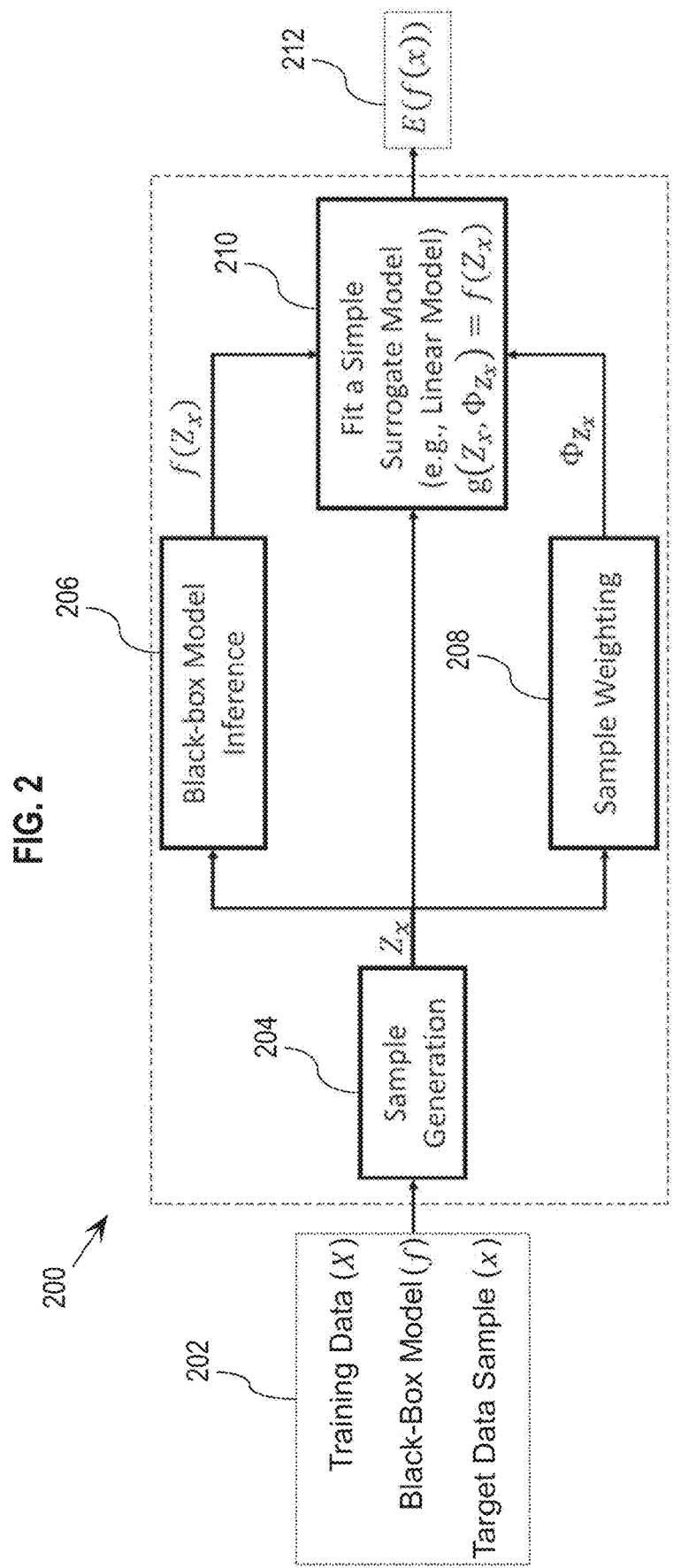
FIG. 2 depicts an end-to-end overview flowchart of a local surrogate ML model explainer application.

FIG. 2 depicts an end-to-end overview flowchart 200 describing the functionality of local model-agnostic SEA 110 that is configured to produce explanations for predictions by black-box ML model 102. According to an embodiment, black-box ML model 102 has been trained based on training data set 122, which comprises a set of data samples, each of which is associated with a plurality of features with accompanying feature values and a label of an expected prediction for the data sample.

At step 202 of flowchart 200, computing device 100 receives a request to explain a prediction that was produced using black-box ML model 102 for a target data sample. The request includes information identifying training dataset 122 used to train black-box ML model 102 (referred to as Xin flowchart 200), black-box ML model 102 (referred to as f in flowchart 200), and target data sample 124 (referred to as x in flowchart 200).

At step 204 of flowchart 200, some number of data samples (referred to as $Z_x$ in flowchart 200) are generated closely around target data sample 124 to produce a surrogate training data set, such as surrogate training data set 126. Generation of data samples is described in further detail below.

At step 206, labels for the generated data samples are computed using black-box ML model 102 (referred to as $f(Z_x)$ in flowchart 200). Specifically, the predictions of black-box ML model 102 are used as the expected predictions for surrogate training data set 126 being produced.

At step 208, a set of weights (referred to as $\Phi_{Z_x}$ in flowchart 200) are generated to weight each data sample, of the generated surrogate training data set, based on the relationships of the respective data samples to target data sample 124 in the feature space. These weights cause the surrogate ML model, trained using the generated surrogate training data set, to give greater weight to data samples that are semantically closer to target data sample 124 than data samples that are farther from target data sample 124, where semantic similarity is defined in further detail below. Identifying weights for data samples in the surrogate training data set is also discussed in further detail below. It is noted that semantic similarity (or semantic distance) between two data points is distinct from feature-based similarity (or Euclidean distance within the feature space) between the data points. Similarity of data points herein is generally based on feature-wise (or Euclidean) similarity unless otherwise indicated.

At step 210, a surrogate ML model that is one of a class of inherently interpretable models (referred to as g in flowchart 200), such as surrogate ML model 104, is fit to the output of black-box ML model 102 based on the labeled, weighted data samples in the surrogate training data set (126) (represented as $g(Z_x, \Phi_{Z_x})=f(Z_x)$ in flowchart 200).

At step 212, a local explanation for the prediction of black-box model 102 for target data sample 124 (referred to as E(f(x)) in flowchart 200) is extracted from trained surrogate ML model 104. Because of the quality of the data samples generated for the surrogate ML model training, trained surrogate ML model 104 models a faithful approximation of the behavior of black-box ML model 102 in the local neighborhood of target data sample 124. Thus, using the inherent interpretability of surrogate ML model 104, an explanation of the local behavior of black-box ML model 102 is generated based on surrogate ML model 104. For example, the extracted explanation indicates which features increase/decrease the likelihood of the indicated prediction and/or of other possible predictions, which features are more relevant to the black-box prediction in the neighborhood of target data sample 124, etc.

Formally, the techniques illustrated in FIG. 2 optimize the following Function 2:

$$E(f(x))=\mathrm{argmin}_{g \in G} \mathrm{Loss}(g(Z_x, \Phi_{Z_x}), f(Z_x)) \quad \text{(Function 2)}$$

In other words, the goal of training surrogate ML model 104 is to minimize the difference between the output of black-box ML model 102 and the output of trained surrogate ML model 104 given the data sample feature space and the generated weights for the data samples. The following sections provide additional details regarding steps outlined in flowchart 200.

Systematic Data Sample Generation

Figure 3:
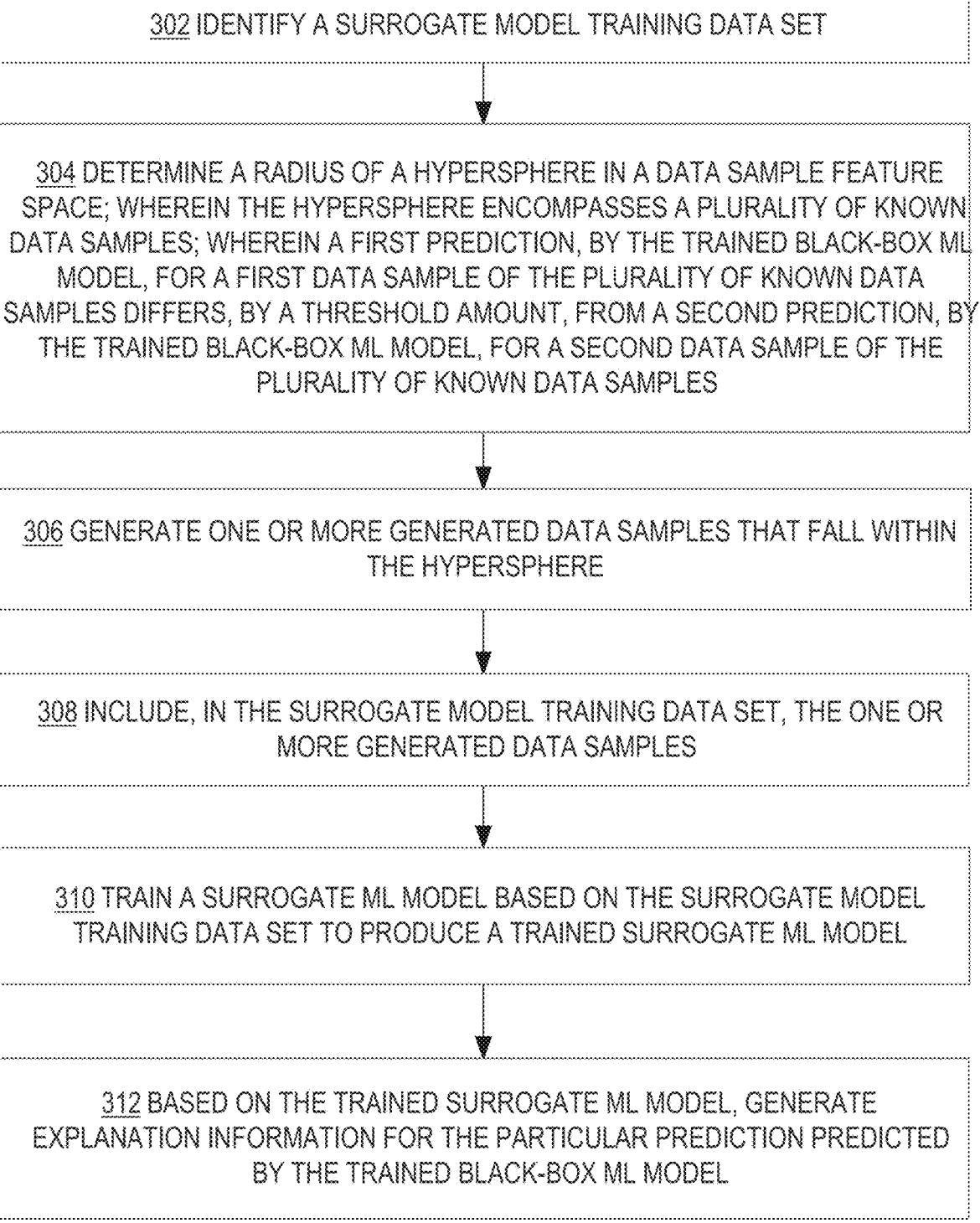
FIG. 3 depicts a flowchart for explaining a particular prediction by a trained black-box ML model for a target data sample using a surrogate ML model that is trained using a systematically-generated training data set.

Techniques described herein systematically generate, for a surrogate training data set, data samples that are local to a given target data sample, which improves on exhaustive or random data sample generation techniques. FIG. 3 depicts a flowchart 300 for explaining a particular prediction by a trained black-box ML model for a target data sample using a surrogate ML model that is trained using a systematically-generated training data set.

At step 302 of flowchart 300, a surrogate model training data set is identified. For example, after receiving a request to explain target data sample 124 for black-box ML model 102 (trained using training data set 122), SEA 110 generates a surrogate training data set 126 to train surrogate ML model 104. According to an embodiment, identifying the surrogate model training data set comprises steps 304-308 of flowchart 300.

Defining a Bounded Region for Data Sample Generation

At step 304, a radius of a hypersphere, in a data sample feature space, is determined, where the hypersphere encompasses a plurality of known data samples, and where a first prediction, by the trained black-box ML model, for a first data sample of the plurality of known data samples differs, by at least a threshold amount, from a second prediction, by the trained black-box ML model, for a second data sample of the plurality of known data samples. For example, SEA 110 determines a radius of a hypersphere, in the data sample feature space for training data set 122, that is centered based on the location of target data sample 124 in the feature space. For example, the hypersphere is centered at the location of target data sample 124, or the hypersphere is centered within a relatively small threshold distance (such as up to the Euclidean distance between the target data sample and the next-closest data sample in the training dataset) from target data sample 124, etc. Herein, when the hypersphere is described as being centered at the target data sample, this description encompasses embodiments where the hypersphere is centered within a threshold distance from the target data sample. Accordingly, comparisons of distances of data samples from the target data sample to the radius of the hypersphere (when the target data sample is located at the center of the hypersphere) also encompass comparisons of distances of data samples from the center of the hypersphere to the radius of the hypersphere (when the hypersphere is centered at a position other than the target data sample).

To illustrate, let $f: R^n \rightarrow R^k$ be the black-box ML model 102 to explain, $x \in R^n$ be the specific data sample to explain from a dataset $(X=\{x^{(0)}, x^{(1)}, x^{(2)}, \ldots x^{(N-1)}\})$ with n features, and k be the number of output targets from black-box ML model 102 (e.g., dataset classes or regression targets, where $k \geq 1$). The term f (x) is the black-box ML model prediction probabilities (classification) or prediction values (regression). According to an embodiment, the first step for data sample generation to identify surrogate training data set 126 is to define $S_x$, which is the extent of the neighborhood around the target data sample, x. $S_x$ is expressed by an n-dimensional hypersphere of radius $r_S$, centered at x, which defines the bounded region for local data sample generation by SEA 110.

According to an embodiment, radius $r_S$ is determined based on the distance from x to the closest black-box distinctive district, which is a region in the feature space in which the predictions by black-box ML model 102 are different from the prediction for x by some threshold. The change that defines distinctive districts within the model prediction can be defined as below for classification and regression:

Classification: A change in the prediction probabilities beyond a specified threshold or a change in the predicted class.

Regression: A change in the predicted output beyond a specified threshold.

Accordingly, the region $Z_x$ in the feature space is formally defined as a distinctive district for x iff:

$$\exists z \in Z_x | f(x)-f(z)| \geq \text{threshold} \quad \text{(Function 3)}$$

SEA 110 initializes the determination of the hypersphere for x based on an initial hypersphere of radius $r_{S_0}$ around x. SEA 110 tests the hypersphere to determine whether the hypersphere includes at least one distinctive district by generating random data samples $Z \in R^n$ such that:

$$\{z \in \mathbb{R}^n | d(x, z) \leq r_{S_0}\} \quad \text{(Function 4)}$$

According to an embodiment, $r_{S_0}$ defines a radius that is very close to the target data sample. The term d(x, z) denotes the distance between x and z (e.g., Euclidean distance). $S_0$ represents the hypersphere in the feature space around x defined by $r_{S_0}$. If Function 3 is satisfied for $S_0$, SEA 110 determines that $S_0$ includes data samples from at least one distinctive district in the vicinity of target data sample 124.

Accordingly, SEA 110 defines the radius ($r_S$) of the neighborhood extent to be used to generate data samples for the surrogate training data set as $r_S \leftarrow r_{S_o}$. Otherwise, the hypersphere radius ($r_{S_j}$) is gradually increased by a multiple, $\delta$ (where $\delta > 1$), and SEA 110 repeats the above-described test to determine whether the hypersphere includes at least one distinctive district. This process is continued until the condition in Function 3 is met and SEA 110 identifies $r_S$.

The amount that the radius is increased, $\delta$, may be a pre-defined value, or may be a dynamic value based on the distance from the target data sample to the training points. For example, percentiles of the distance can be used to set the dynamic value: $\delta = k\_percentile/r_S$, where $k \in \{1, 2, 3, \ldots, 99\}$. In this case, the hyperspheres will have radii equal to k-percentile of distances from the target data sample to the training data samples.

The following Algorithm 1 summarizes the process of defining the local neighborhood extent.

---
Algorithm 1 Local Neighborhood Extent
---
Require: f, x, $r_{S_0}$
1:  $r_S \leftarrow r_{S_0}$
2:  found $\leftarrow$ False
3:  while not found do
4:      Z $\leftarrow$ randomly generated data samples within a hypersphere of radius $r_S$
5:      if Z includes a distinctive district then //as defined in Function 3
6:          found $\leftarrow$ True
7:      else
8:          $r_S \leftarrow r_S \times (\delta > 1)$
9:      end if
10: end while
11: return $r_S \times (\delta' > 1)$ //the radius is further increased to cover black-box complexities around the border
---

With respect to Z in Algorithm 1, Z represents randomly generated data samples within the hypersphere being evaluated. Using randomly generated data samples to identify the hypersphere avoids the requirement of an exhaustive search for a distinctive district, which increases the efficiency of the algorithm. If too many data samples are included in Z (such as with an exhaustive search), the analysis becomes too expensive, and if too few data samples are included in Z, the analysis may not effectively identify a distinctive district in a given hypersphere. According to an embodiment, the number of generated samples is a configurable number, such as 5000. According to an embodiment, the number of generated samples is automatically determined, linearly, based on the number of features of the dataset, e.g. factor* n_features, given that an exhaustive search is not required for systematic sample generation. An example of an exhaustive search would be when the number of generated samples has an exponential relationship with the number of features to cover all possible permutations.

Step 11 of Algorithm 1 slightly increases the final identified radius of the hypersphere to ensure that the identified hypersphere does, indeed, include a distinctive district as defined in Function 3. Specifically, it is possible that the change identified at the border of the hypersphere is the result of noise or an isolated predicted change that is not indicative of a border between distinctive districts. In this case, increasing the identified radius, as in step 11, allows for evaluation of data samples located slightly past the point at which Function 3 was first satisfied.

Based on the slight increase of the radius of the hypersphere according to step 11 of Algorithm 1, the hypersphere captures additional information that may indicate reasons behind the black-box ML model's predictions (e.g., the first identified classification border may not be the most important, or even relevant to the data sample being explained). Pushing R beyond the first identified border helps to ensure that additional information around the decision boundary is captured (instead of just scratching the surface). Additionally, the hypersphere is centered around the target data sample, or is centered at most a relatively small threshold distance from the target data sample. Therefore, it is guaranteed that the area around the sample and the identified decision boundary are included in the sample space, while also including any other prediction boundaries in other directions that may fall within the hypersphere.

Data Sample Generation

At step 306, one or more generated data samples that fall within the hypersphere are generated. Also, at step 308, the one or more generated data samples are included in the surrogate model training data set. For example, once the neighborhood extent (i.e., the hypersphere $S_x$) has been defined, SEA 110 generates/identifies data samples, which fall within $S_x$, to include in surrogate training data set 126.

Data samples fall within $S_x$ when they have a maximum distance to the target sample (or to the center of the hypersphere) of $r_{S_x}$. The values of features of generated data samples could include combinations that do not occur in the training data set. However, the generated samples are guaranteed to be in close proximity to the target data sample (i.e., within the hypersphere). Thus, any deviation from feature correlations in the training data set will be relatively minor such that the distance of a generated sample from the target data sample (or center of the hypersphere) does not exceed $r_{S_x}$. For example, a generated data sample changes a single feature from the target data sample feature value by a relatively large amount (with other feature values of the generated sample being the same or very similar to the feature values of the target data sample), or a generated data sample changes multiple features by smaller amounts.

Accordingly, SEA 110 identifies and/or generates data samples within the defined hypersphere that: (a) preserve the training data set characteristics, such as feature correlation and distribution; (b) cover black-box complexities affecting the model output in the vicinity of the data sample; and (c) are highly local to the data sample of interest. According to one or more embodiments, SEA 110 identifies the data samples in the determined hypersphere for surrogate training data set 126 by performing one or more of:

1. Selecting one or more data samples from training data set 122 that fall within $s_x$.
2. Generating new data samples:
    a. For numerical features:
        i. Generate random values using the feature distributions captured from the local training points obtained in step one. These randomly generated data samples are, thus, restricted to $s_x$, which guarantees that the generated data samples are closely grouped around the target data sample and will be useful in training the surrogate ML model.
        ii. Randomly draw data samples from the feature space according to the following Function 5:

$$[(x_1 - \sigma, x_1 + \sigma), (x_2 - \sigma, x_2 + \sigma), \ldots (x_n - \sigma, x_n + \sigma)],$$
$$\sigma = r_S/\sqrt{n} \quad \text{(Function 5)}$$

As indicated above, this random draw of data samples involves minor perturbations of feature values ($x_i$) to increase the variety of data samples within the data sample feature space. According to an embodiment, the amount of perturbation (σ) is based on the determined radius of the hypersphere ($r_S$) and the number of features (n). Determining the amount of perturbation using the radius of the hypersphere allows bounding of the perturbation with relation to the size of the data sample feature space being explored. If σ were a fixed value, the perturbations might be over-sized (causing generation of data samples that are potentially not feasible) or under-sized (causing generation of data samples that do not effectively explore the data sample feature space).

b. For categorical features:
        i. Generate random values based on the frequency of feature values in the local training points obtained in step one. Using the frequency of feature values in the training data samples that fall within $s_x$ ensures that the randomly generated features are also within $s_x$.

Steps 1, 2.a.i, and 2.b.i include data samples that represent the characteristics of training data set 122, on which black-box ML model 102 is trained. Step 2.a.ii covers other possible data samples from the remaining regions in the local neighborhood. According to an embodiment, the aggregation of data samples generated from the aforementioned steps is utilized to train surrogate ML model 104. This ensures that black-box ML model 102 is evaluated on local data that the model has both trained on and not been trained on before, effectively exploring the local behavior of the black-box ML model.

According to an embodiment, SEA 110 does not consider correlations between features within the training data set. Thus, the generated data samples may not adhere to correlations between features that would be found in data samples from training data set 122. However, the inclusion of training set samples within $S_x$ maintains correlations between features present in the training data of the black-box model, and the minor perturbations generally do not break the correlations in a way that negatively affects the explanations derived from the surrogate ML model.

Figure 4:
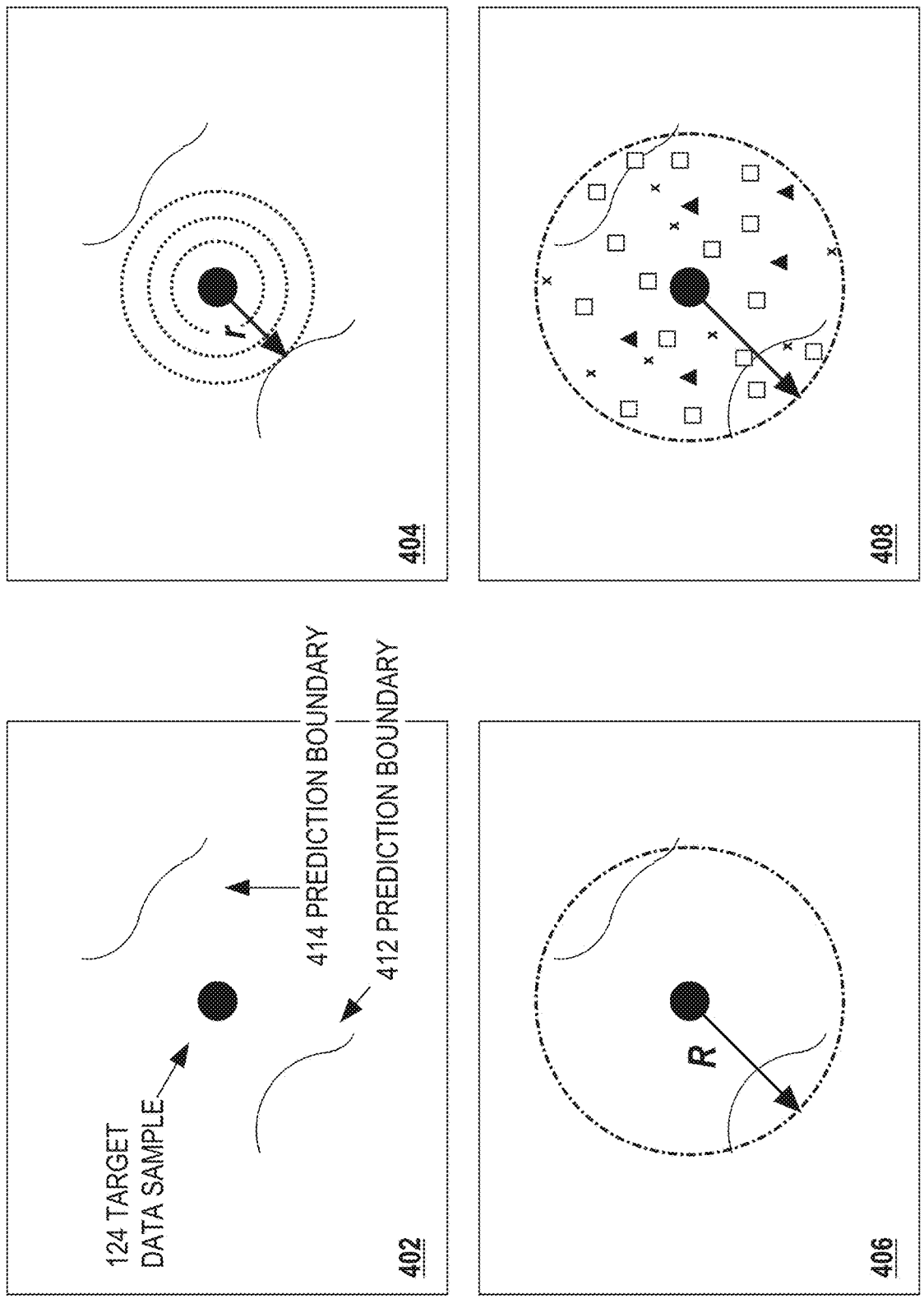
FIG. 4 depicts systematic data sample generation based on identifying a hypersphere in the data sample feature space.

FIG. 4 depicts systematic data sample generation based on identifying a hypersphere in the data sample feature space. Specifically, FIG. 4 depicts generation of data samples by SEA 110 using illustrations 402-408. According to an embodiment, given the target data sample (e.g., target data sample 124 shown in black in illustration 402), SEA 110 finds the closest distinctive district to target data sample 124 by iteratively increasing a radius r of exploratory neighborhood extents, as shown in illustration 404.

Prediction boundaries 412 and 414 represent changes in predictions produced by black-box ML model 102 in the data sample feature space. For example, at prediction boundary 412, a categorical-type prediction may change from a 0 to a 1, a likelihood of a given prediction may change by at least a threshold amount, or a numerical prediction may change by at least a threshold amount. Once the radius r reaches the closest distinctive district, e.g., bounded by prediction boundary 412, SEA 110 defines the extent of the local neighborhood based on the value of r at which the prediction boundary was identified. Illustration 406 depicts an identified radius R, which is expanded from the identified r by a small amount. As shown in illustration 408, SEA 110 then identifies training points from training data set 122 (shown by triangles) that are within the local neighborhood defined by R, generates randomly generated data samples (shown by squares) according to the training data distribution, and also generates randomly generated data samples (shown by crosses) in the local neighborhood.

Weighting Data Samples to Measure Semantic Proximity

According to an embodiment, the data samples in surrogate training data set 126 are weighted relative to target data sample 124. These data samples could be weighted based on their distance in the feature space to the target data sample (e.g., a kernel function based on Euclidean distance). With such weights, when the surrogate explainer model is trained on the generated data sample feature space, the model places more weight on the data samples closer to the target data sample.

However, based on experimentation, a kernel function based on Euclidean distance does not necessarily provide a representative view of similarity between generated data samples and the target data sample. Thus, according to an embodiment, an alternative approach for weighting data samples based on a supervised neighborhood selection algorithm, which measures semantic similarity between data points, is employed. (Additional information for weighting data samples based on a supervised neighborhood selection algorithm is found in Plumb, Gregory, Denali Molitor, and Ameet S. Talwalkar. "Model Agnostic Supervised Local Explanations." Advances in Neural Information Processing Systems. 2018, the entirety of which is incorporated by reference as if fully set forth herein. Also, information about the supervised neighborhood selection algorithm is also found in Bloniarz, A., Talwalkar, A., Yu, B. & Wu, C. (2016). "Supervised Neighborhoods for Distributed Nonparametric Regression". Proceedings of the 19th International Conference on Artificial Intelligence and Statistics, in PMLR 51:1450-1459, the entirety of which is incorporated by reference as if fully set forth herein.)

Specifically, $f: R^n \rightarrow R^k$ represents the black-box ML model being explained, $x \in R^n$ represents the target data sample, and $Z_x \in R^n$ represents the local neighborhood for x. Data samples in $Z_x$ ($z \in Z_x$) are labeled by the black-box ML model. In order to measure semantic proximity (similarity) of data samples in $Z_x$ to x, a forest ensemble (such as a random forest model) is trained on the original training data used to train the black-box ML model (e.g., training data set 122). The trained random forest model is used to assign weights to each $z \in Z_x$ based on the frequency of each data sample being in the same leaf node as x through the trees of the random forest. The more frequently the data sample appears in the same leaf node as x, the greater the proximity measure for the data sample. This is a form of supervised similarity.

Specifically, the trees of the trained random forest are used to identify data samples that are in the same one or more leaf nodes as x, $Z'_x = \{z \in Z_x | \text{leaf}(z) = \text{leaf}(x)\}$. The weights of these data samples are increased by $$\frac{1}{\text{length}(Z'_x)}.$$

The key idea here is that similarity is not assigned using Euclidean distance (based on the differences in feature values) and is instead computed based on the data samples' similarity with respect to the supervised task. The combination of the above-described systematic data sample generation and the supervised data sample weighting technique based on semantic similarity significantly improves the fidelity and repeatability of prediction explanations produced by SEA 110, according to the techniques described in detail above.

The Surrogate ML Model

Returning to a discussion of flowchart 300 of FIG. 3, at step 310, a surrogate ML model is trained based on the surrogate training data set to produce a trained surrogate ML model. For example, after SEA 110 generates surrogate training data set 126, as described in detail above, where the data samples of the data set are labeled with corresponding predictions produced by black-box ML model 102, SEA 110 uses surrogate training data set 126 to train surrogate ML model 104 to predict the labels for the data samples.

After surrogate ML model 104 has been trained on the compiled surrogate training data set 126, the model is used to produce a local explanation for target data sample 124. Accordingly, at step 312, explanation information is generated for the particular prediction predicted by the trained black-box ML model based on the trained surrogate ML model. For example, SEA 110 uses trained surrogate ML model 104 to produce explanation information for target data sample 124 that includes an impact metric measuring an impact of each feature of target data sample 124 on the prediction produced using black-box ML model 102 for target data sample 124.

Figure 5:
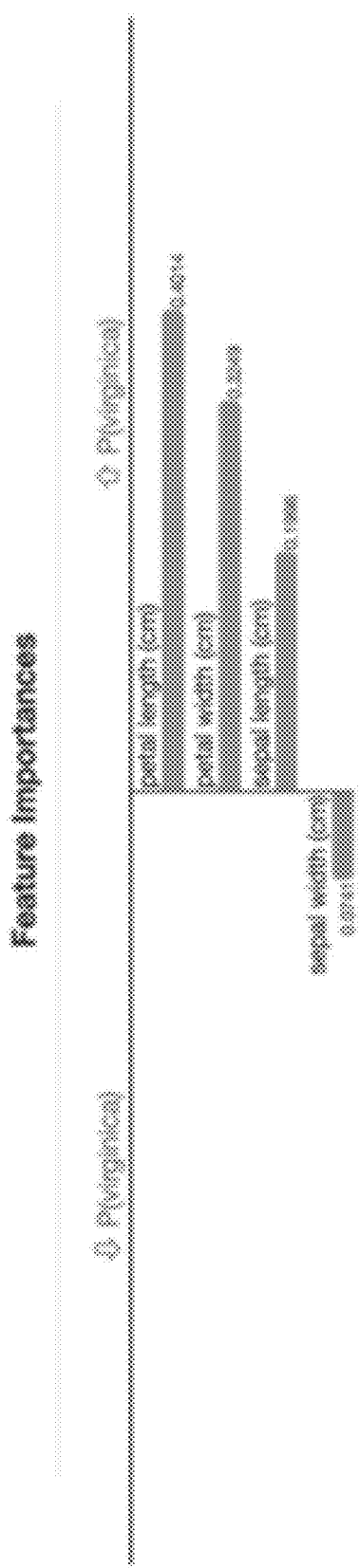
FIG. 5 depicts an example explanation generated by an explainer for a prediction produced using a black-box ML model for a target data sample.

FIG. 5 depicts an example explanation generated by SEA 110. Examples herein are described in the non-limiting context of data samples conforming to the Iris dataset. This dataset contains four numerical features (petal length, petal width, sepal length, and sepal width) and three target classes (Setosa, Versicolor, Virginica). (See Scikit-learn: Machine Learning in Python, Pedregosa et al., JMLR 12, pp. 2825-2830, 2011.) In example training data set 122, each data sample is associated with all four features of the Iris dataset, as well as an expected prediction, which is one of "Virginica", "Setosa", and "Versicolor". Black-box ML model 102 is trained to predict one of the indicated classifications based on the associated feature values of the data samples in training data set 122. Nevertheless, techniques described herein may be used with any kind of dataset and with any kind of prediction, including classification- or regression-based predictions.

Specifically, FIG. 5 depicts an explanation for a prediction of target data sample 124 being a data sample from the Iris dataset. In this example, black-box ML model 102 predicts that target data sample 124 is an Iris Virginica. The representation of the example information in FIG. 5 identifies a plurality of features of target data sample 124, and the relative contributions of the features towards the prediction of Virginica. The explanation information indicates that the feature values of petal length, petal width, and sepal length contribute, by varying degrees, to the prediction of Virginica, and the value of sepal width goes against the prediction of Virginica. This data indicates that petal length and petal width are the two most important features in predicting Virginica for this specific data sample.

Given the target data sample, the surrogate model defines how the black-box model behaves relative to that sample. However, according to an embodiment, this trained surrogate ML model 104 may also be used to explain predictions, produced using black-box ML model 102, for other data samples that fall within the hypersphere defined for target data sample 124. Specifically, the surrogate ML model generated for a given target data sample may be generalized to other data samples within the hypersphere. For example, if the surrogate model is a linear model, a positive coefficient would indicate that an increase in the associated feature value would cause the black-box model prediction to increase accordingly. In this example, the surrogate ML model can be used to estimate what might happen if features in the target data sample change by a small amount.

According to an embodiment, if the prediction generated for a new target data point is similar (e.g., within a threshold amount used to identify a distinctive district) to the prediction generated for the target data sample for which a surrogate ML model was generated, the same surrogate ML model is used to generate an explanation for the prediction of the new target data point given that the previously-generated surrogate ML model represents the behavior of the black-box model in the neighborhood of the new target data point. In this case, computing resources are conserved because it is not necessary to construct a surrogate ML model for the second, similar, target data point.

On the other hand, according to an embodiment, when the prediction generated for a new target sample differs, by at least the threshold amount (used to identify a distinctive district), from the prediction generated for the target data sample for which a surrogate ML model was generated, the new target sample belongs to a distinctive district. For this case, a new surrogate ML model is generated to produce the explanation for the new target data point.

To illustrate, referring to the flowchart of FIG. 2, SEA 110 receives the indicated inputs at step 202, and, before performing any other step of flowchart 200, determines that the new target data sample is within the hypersphere defined for target data sample 124 and has a prediction that is within a threshold amount of the prediction for the original target data sample. In response to this determination, instead of fitting another instance of a surrogate ML model to data for the new target data sample, SEA 110 uses the previously-trained surrogate ML model 104, trained using training data set 126 determined for target data point 124, to explain the prediction associated with the new target data sample.

Experiments

This section analyzes multiple different aspects of the systematic local explainer described herein. First, the systematic local explainer (an example of which is implemented by SEA 110 as described herein, and which is referred to herein as SEA 110 for ease of explanation) is evaluated with respect to experimental results demonstrating the faithfulness of SEA 110 to the black-box ML model being explained.

Locality Analysis

To visualize the generated data sample feature space, regardless of the dimensionality, two data charting approaches are used to depict data samples:
(1) principal component analysis (PCA) is applied to the local neighborhood and the top two principal components are shown in the right column of FIG. 6; and
(2) original feature values of the two most important features (petal length, and petal width) are shown in the left column of FIG. 6.

Note that, in the case of the Iris dataset, petal length and petal width are the most important features with respect to data sample classification. Visualizing the transformed feature space helps to compare the ability of different data sample generation approaches to remain local to a target data sample.

Figure 6:
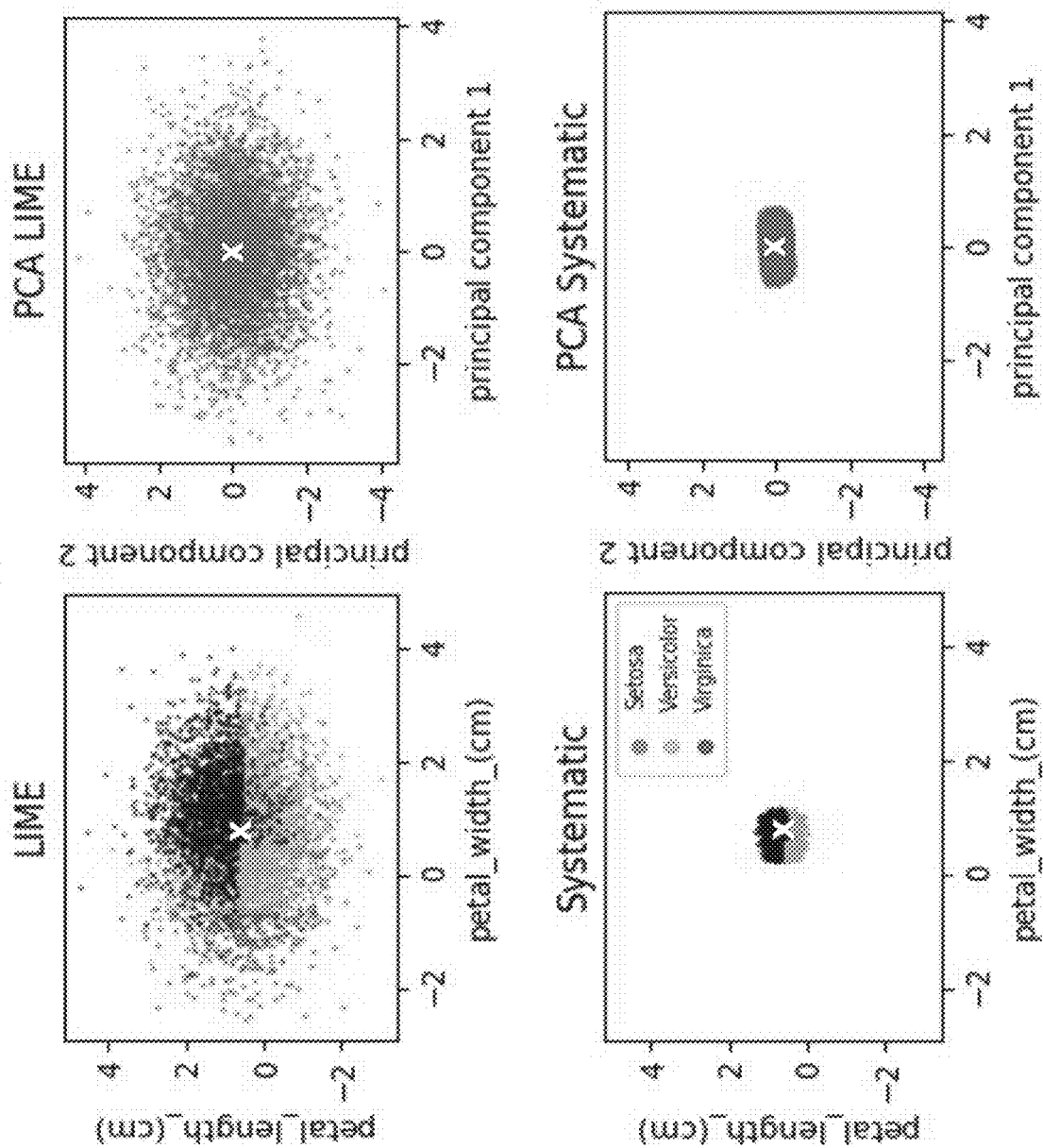
FIG. 6 depicts a comparison between data sample localities generated by the systematic explainer application and LIME for the Iris dataset.

FIG. 6 depicts a comparison between data sample localities generated by SEA 110 and LIME for the Iris dataset. The left column represents the values for the top two important features of the data points generated by the different data sample generation techniques, and the right column shows the PCA representations of all features of the data points. The white cross in each of the graphs represents the target data sample. Data samples in the datasets are labeled by the black-box ML model, and different colors (black, medium gray, and light gray) on the left represent different class predictions for the depicted data samples.

The charts depicted in FIG. 6 indicate that SEA 110 identifies data points in a much tighter region around the target data sample than LIME's sparse random data sample generation, while still including the nearest black-box prediction boundary between black (Virginica) and light gray (Versicolor) data points (i.e., in the left column). SEA 110 identifies this prediction border and uses it to define the local neighborhood extent, as described in detail above. Afterwards, SEA 110 generates data samples within the identified local neighborhood extent, also described in further detail above. This analysis indicates that SEA 110 satisfies the desirable locality property for local prediction explanations.

Considering the local neighborhoods generated by LIME and SEA 110, it is noted that the data samples generated by SEA 110 are strictly limited to the vicinity of the target data sample, satisfying the desirable property of locality. On the other hand, LIME generates a sparse local neighborhood which covers a wide range of the feature space.

Both LIME and SEA 110 fit an inherently interpretable surrogate ML model, such as a linear model, to the generated local data samples in order to explain the local behavior of the black-box ML model. Considering the complexity of the sparse neighborhood generated by LIME and the existence of multiple black-box boundaries therein (e.g., all three target classes are covered by LIME's generated data sample feature space), inherently interpretable surrogate ML models may not be able to fit the data accurately. Additionally, the interpretable surrogate ML model in LIME is fit on data samples that are much further away from the target data sample than is used by SEA 110. Moreover, the PCA analysis of the two local neighborhoods and their principle component projections (the right column) indicate that the data samples generated by SEA 110, in addition to their spatial closeness (as indicated in the left column), are also semantically close to the target data sample.

Fidelity Analysis

To provide valid explanations, the local surrogate explainer models must be locally faithful to the black-box ML model's behavior. Thus, the local fidelity of trained surrogate ML models produced by SEA 110 is analyzed with respect to the black box ML model, and is also compared against the fidelity of surrogate models produced by existing approaches.

Accordingly, the behaviors of surrogate models produced for a black-box ML model according to each of LIME, MAPLE, and SEA 110 are compared to the behavior of the black-box ML model. In an approach proposed in the MAPLE reference (referred to herein as the "MAPLE testing approach"), for each target data sample (x), five random data samples are generated in its vicinity using the normal distribution N (x, σ=0.1). The dataset features and the target values in regression datasets are normalized to have zero mean and unit variance. These random data samples are labeled by the black-box ML model. The predictions of the linear surrogate ML models obtained from LIME, MAPLE, and SEA 110 on the five generated data samples are compared to the predictions of the black-box ML model. The root mean squared error (RMSE) of the surrogate ML model predictions relative to the black-box ML model responses are presented in Table 1 below.

Table 1 represents a comparison between averages of measures of fidelity of trained surrogate models generated by LIME, MAPLE, and local SEA 110. Below are the steps followed to generate the results in Table 1:

LIME, MAPLE, and SEA 110 were each used to generate explanations for the same set of target data samples.

A leave-out set was generated using the MAPLE testing approach described above.

The labels were obtained for the leave-out set samples by running the black-box model on the samples.

Finally, the fidelity of the trained surrogate models, from the different approaches, were compared to the black-box model on the leave-out samples and their labels.

The local fidelity of the explainer surrogate models relative to the black-box ML model is measured by RMSE. The Dataset_1–Dataset_11 are regression datasets and the rest are classification datasets. All of the features and target values in regression datasets are normalized to have a zero mean and a variance of one. Note that, for each listed dataset, a separate test set was generated for each technique, where each test set includes an explanation produced using the applicable technique for every sample in the applicable dataset. Each separate test set was then averaged, as shown in the dataset rows of Table 1. However, the fidelity (RMSE) scores between surrogate model and black-box model are evaluated on the five samples generated following the MAPLE testing approach described above.

TABLE 1

| Dataset | LIME | MAPLE | SEA 110 |
|---|---|---|---|
| Iris | 0.349 | 0.160 | 0.091 |
| Dataset_1 | 0.285 | 0.119 | 0.060 |
| Dataset_2 | 0.376 | 0.297 | 0.079 |
| Dataset_3 | 0.201 | 0.551 | 0.090 |
| Dataset_4 | 0.261 | 0.172 | 0.208 |
| Dataset_5 | 0.300 | 0.180 | 0.128 |
| Dataset_6 | 0.403 | 0.232 | 0.125 |
| Dataset_7 | 0.326 | 0.305 | 0.176 |
| Dataset_8 | 0.311 | 0.191 | 0.155 |
| Dataset_9 | 0.292 | 0.301 | 0.167 |
| Dataset_10 | 0.408 | 0.173 | 0.156 |
| Dataset_11 | 0.414 | 0.089 | 0.078 |
| Dataset_12 | 0.239 | 0.117 | 0.086 |
| Dataset_13 | 0.721 | 0.186 | 0.157 |
| Dataset_14 | 0.118 | 0.078 | 0.048 |
| Dataset_15 | 0.220 | 0.176 | 0.103 |
| Dataset_16 | 0.176 | 0.144 | 0.100 |
| Dataset_17 | 0.242 | 0.228 | 0.151 |
| Dataset_18 | 0.154 | 0.179 | 0.061 |
| Dataset_19 | 0.102 | 0.104 | 0.082 |
| Average | 0.295 | 0.199 | 0.115 |

The results in Table 1 show that, on multiple classification and regression datasets, SEA 110 has consistently higher quality (i.e., is more locally faithful to the black-box ML model's predictions) than both LIME and MAPLE.

Another Approach to Local Explainer Evaluation

In connection with Table 1 above, the fidelity of the explainers was evaluated using a leave-out test set generation approach. Further investigations indicate that this method of generating test data samples may not be realistic or aligned with the spatial properties of the dataset data samples. In other words, the leave-out evaluation sets obtained through this approach can be unrealistically close to the target data sample. Table 2 below compares the Euclidean distances of the training data and the leave-out test set data samples to a given target data sample. The second and third columns of Table 2 show the 1-percentile and 0.1-percentile of Euclidean distances measured from the target data sample to all other data samples in train set respectively, and the last column shows the maximum distance of the generated data samples to the target data sample using the leave-out test set generation approach.

TABLE 2

| Dataset | 1-percentile | 0.1-percentile | Leave-out |
|---|---|---|---|
| Dataset_1 | 0.84 | 0.51 | 0.32 |
| Dataset_6 | 1.04 | 0.83 | 0.34 |
| Dataset_7 | 6.66 | 6.04 | 0.95 |

These results indicate that the distribution of the data samples generated by the leave-out test set generation approach to measure the quality of an explainer does not accurately represent the spatial distribution of the real-world training data samples. In other words, this approach may evaluate data samples that are unrealistically close to the target data sample, resulting in an overly optimistic measurement of quality.

LS proposes a framework to effectively evaluate the faithfulness of explainers to a black-box ML model at different distances from the data sample of interest. The key idea behind this approach is to evaluate the ability of the surrogate ML model to approximate the local behavior of the black-box ML model as the distance from the target data sample increases. The expectation is that a local explainer should accurately approximate the black-box ML model very close to the target data sample and get worse or remain the same as the distance from the target data sample increases. Accordingly, both the locality and fidelity of the explainers are evaluated relative to the black-box ML model using this evaluation approach.

The evaluation approach proposed in LS is as follows. Given a target data sample (x), the Euclidean distance of x to all of the training data is calculated. Multiple hypothetical hyperspheres centered at x are considered, where the sizes of these hyperspheres are defined by different percentiles (P) of the distances computed from all data samples in the training data. For example, five hyperspheres with radiuses of 1-percentile, 5-percentile, 10-percentile, 15-percentile, and 20-percentile, relative to the distances computed between the training data and the target data sample, are generated. Then a large number of uniformly-random data samples are generated within each of these hyperspheres. Finally, the black-box ML model and the surrogate ML model perform inference on the generated data samples in each hypersphere. The quality (fidelity) of the surrogate ML model relative to the black-box ML model can be evaluated by comparing the predictions (e.g., using RMSE) for each hypersphere.

Comparing the surrogate ML model's predictions relative to the black-box ML model's predictions at different distances demonstrates the ability of the local explainer to faithfully approximate the behavior of the black-box ML model as the distance from the target data sample increases. This helps to better understand the local fidelity of the explainer when compared to evaluating the explainer on a single (highly) local region, according to the previously-presented evaluation approach.

Figure 7A:
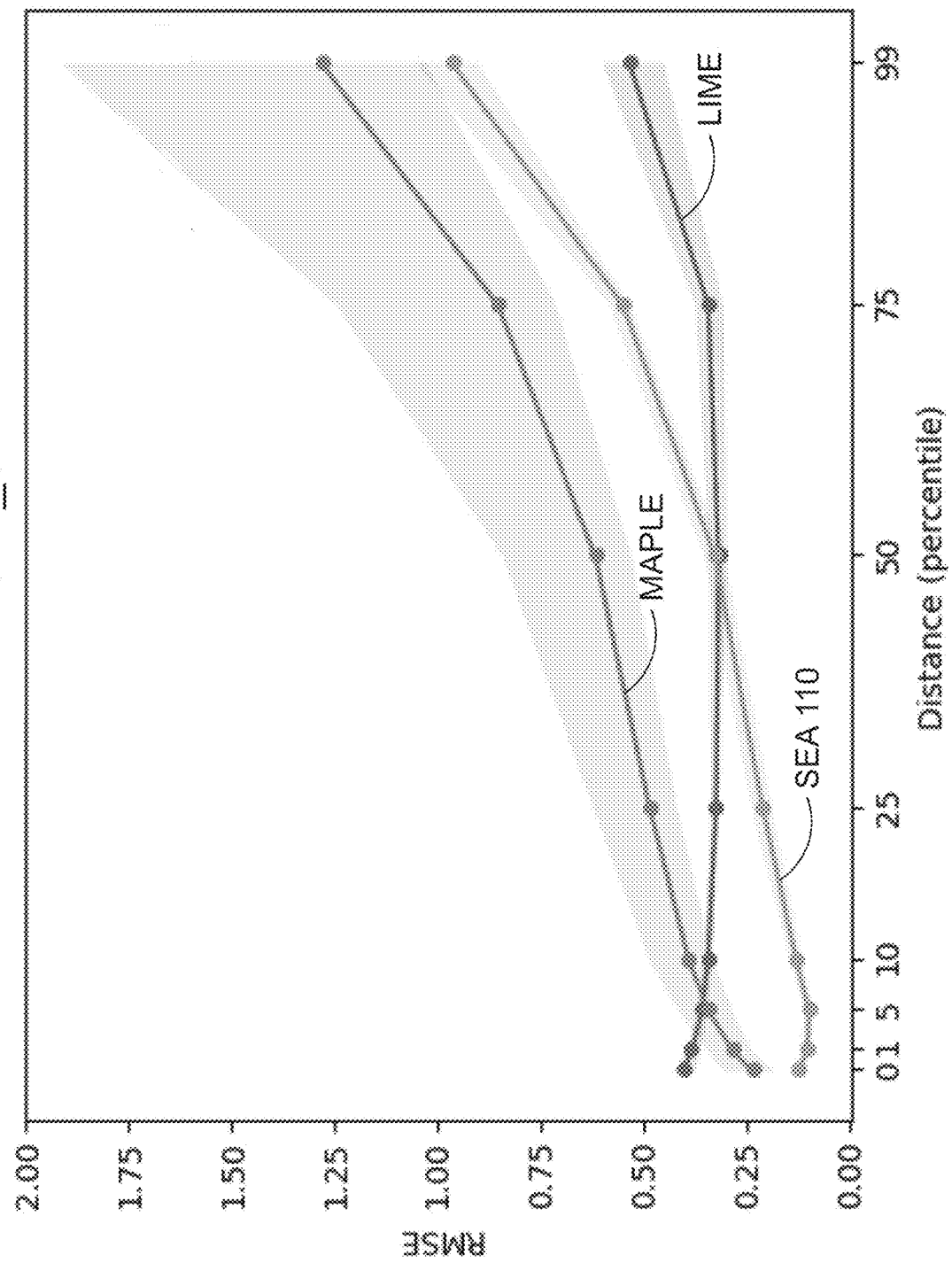
FIGS. 7A-7C depict the results of experimentation that compares the root mean squared error of explanations, computed at different evaluation points based on distance from the target data sample, produced by each of LIME, MAPLE, and the systematic explainer application, and also depict the variance of root mean squared error of explanations over multiple trials.
Figure 7B:
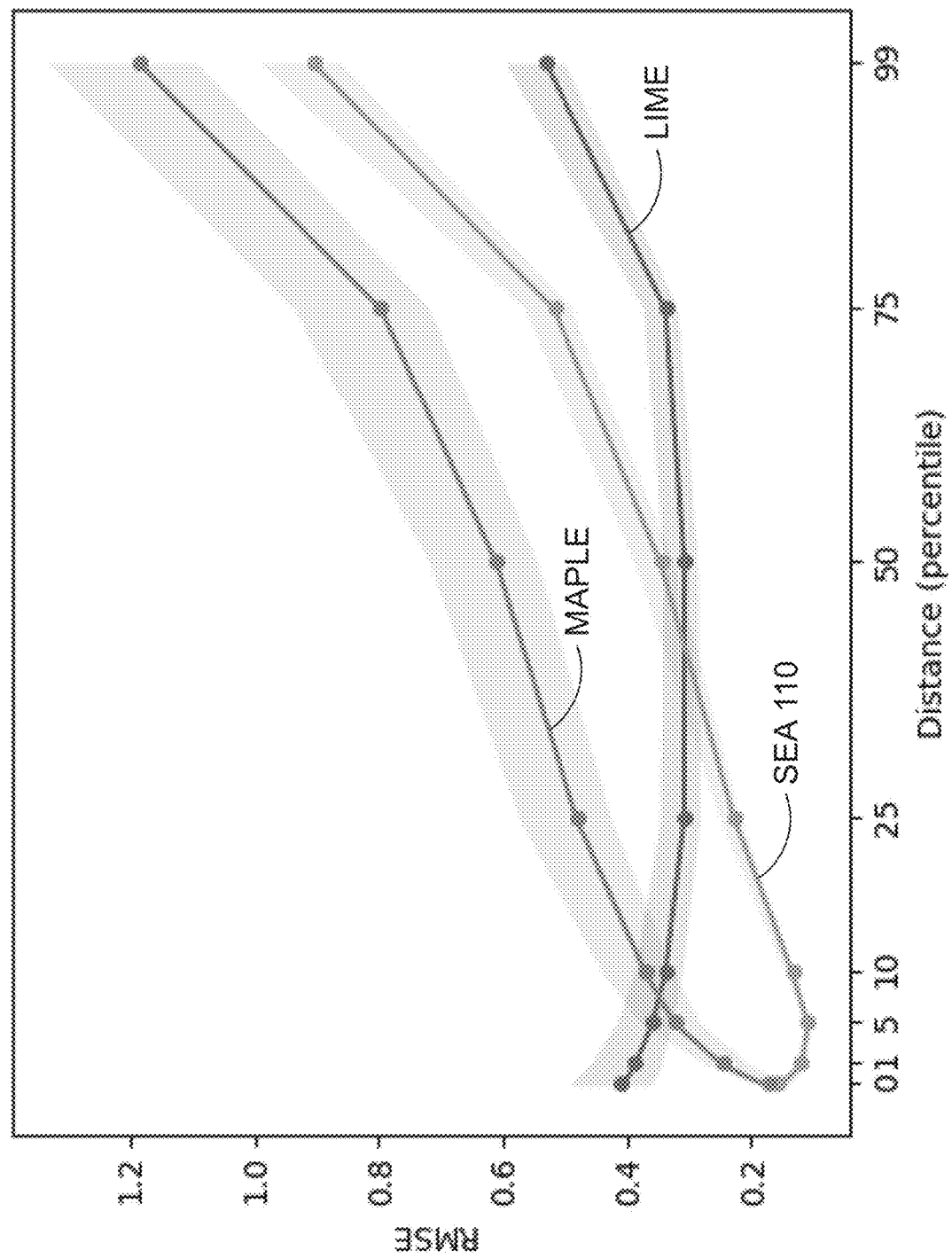
Figure 7C:
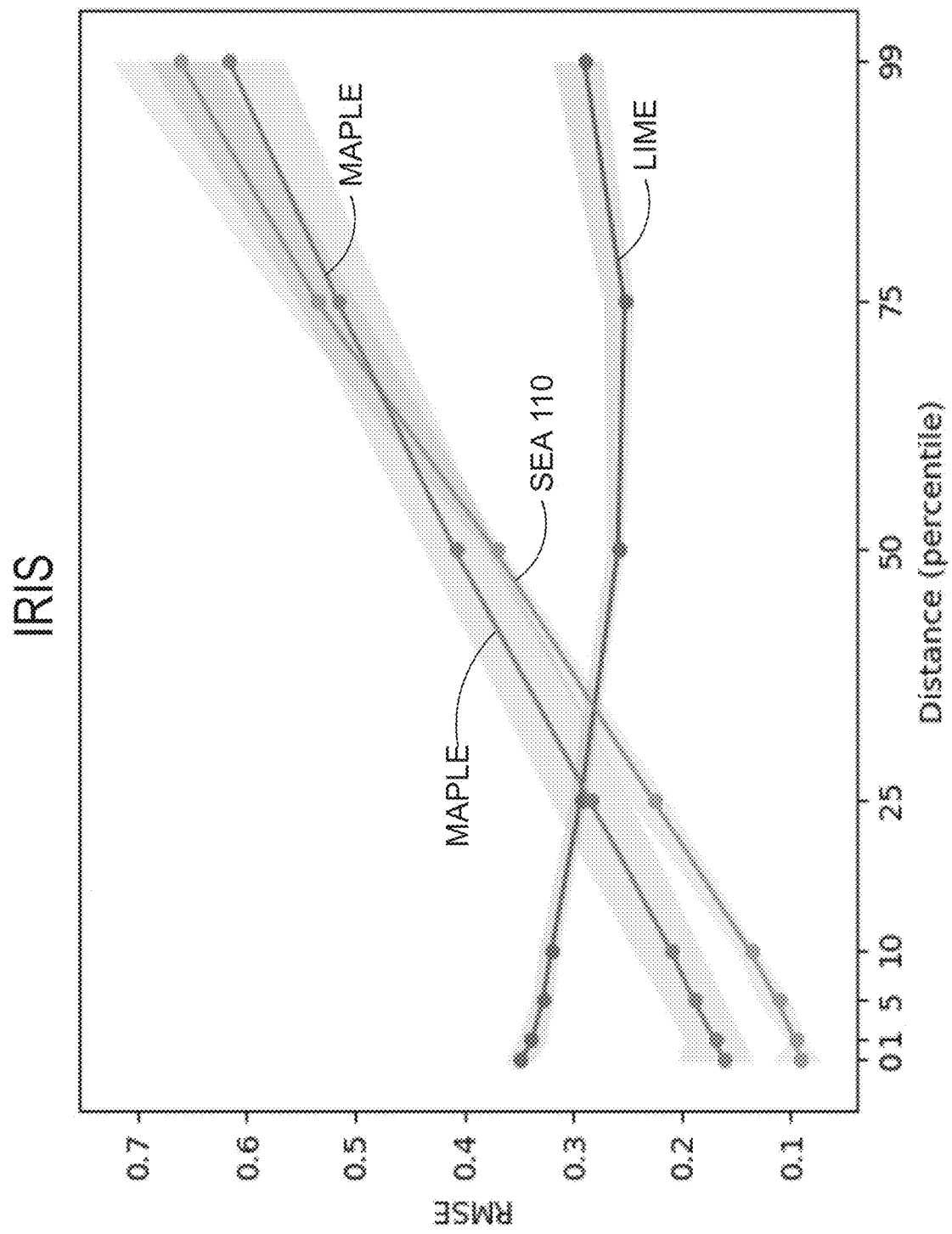

Experiments using this approach were run using surrogate ML models trained according to the approaches of LIME, MAPLE, and SEA 110 for three different subject datasets: Dataset_10, Dataset_6, and Iris from sklearn. The results of these experiments are presented in FIGS. 7A-7C. These figures depict graphs indicating the quality of explainers relative to the black-box ML model. The x-axis represents the maximum distance of the generated data samples used to evaluate the surrogate ML model in percentiles of the distance from the training data set, relative to the target data sample. The 1-percentile indicates that data samples used to evaluate the surrogate ML model were highly local to the target data sample, and the 100-percentile indicates that data samples used to evaluate the surrogate ML model could be generated from anywhere in the train data distribution. The 0 on the x-axis represents data samples generated from the $N(x, \sigma=0.1)$ distribution, as explained above in connection with the MAPLE testing approach. The y-axis represents the corresponding RMSE scores. In these figures, lower (near x=0, which is closer to the target data sample) is better. Solid lines represent average RMSE and shaded areas represent the variation over five trials.

There are three main takeaways from these experiments:
1. When considering the regions that are local to the target data sample (e.g., up to 25-percentile), SEA 110 is able to significantly improve the local fidelity compared to LIME and MAPLE. This data supports the idea that a surrogate ML model trained based on techniques described herein is useful to explain data samples that are similar to the target data sample given that explanations remain faithful even when there are small changes in the subject data point with respect to the target data point.
2. As expected, the quality/fidelity of SEA 110 (and MAPLE) degrades as the distances of subject data points from the target data sample increase. This is because the explanation models are meant to be locally faithful (i.e., the explainer should explain the local behavior of the black-box ML model, not the entire global behavior). However, at times, LIME improves as the distance increases from the target data sample (i.e., the explanations are not locally faithful). This is because of LIME's data sample generation method, which generates data samples that are not necessarily local to the target data sample, and kernel weighting function, which needs to be explicitly tuned to capture the locality of a given target data sample.
3. Finally, the behavior of SEA 110 is more deterministic and less prone to randomness than MAPLE. The shaded areas represent variations in the explanation model's quality over five different trials. As indicated, the explanations generated by SEA 110 are more repeatable, which is a desirable property.

Machine Learning Model

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output, as described above. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, Matlab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of nodes in layer L−1 and L is N[L−1] and N[L], respectively, the dimensions of matrix W are N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input node. The particular input may be stored as vector. Training data comprises multiple inputs, each being referred to as sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., number of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptron (MLP), including matrix operations and backpropagation, are taught in a related reference "Exact Calculation Of The Hessian Matrix For The Multi-Layer Perceptron," by Christopher M. Bishop, the entire contents of which are hereby incorporated by reference as if fully set forth herein.

Model training may be supervised or unsupervised. For supervised training, the desired (i.e., correct) output is already known for each example in a training set. The training set is configured in advance by (e.g., a human expert, or via the labeling algorithm described above) assigning a categorization label to each example. For example, the training set for workload/OS models 320 is labeled, by an administrator, with the workload types and/or operating systems running on the server device at the time the historical utilization data was gathered. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-EN- CODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g., compound geometry) within an input example. Various techniques have emerged that make deep learning be contextual. One general strategy is contextual encoding, which packs a stimulus input and its context (i.e., surrounding/related details) into a same (e.g., densely) encoded unit that may be applied to an ANN for analysis. One form of contextual encoding is graph embedding, which constructs and prunes (i.e., limits the extent of) a logical graph of (e.g., temporally or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection, as described in detail above.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g., unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence. Example mathematical formulae and techniques for RNNs and LSTM are taught in related U.S. patent application Ser. No. 15/347,501, entitled "MEMORY CELL UNIT AND RECURRENT NEURAL NETWORK INCLUDING MULTIPLE MEMORY CELL UNITS."

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, entitled "MEMORY-EFFICIENT BACKPROPAGATION THROUGH TIME".

Random Forest

Random forests or random decision forests are an ensemble of learning approaches that construct a collection of randomly generated nodes and decision trees during the training phase. The different decision trees are constructed to be each randomly restricted to only particular subsets of feature dimensions of the data set. Therefore, the decision trees gain accuracy as the decision trees grow without being forced to over fit the training data as would happen if the decision trees were forced to be restricted to all the feature dimensions of the data set. Predictions for the time-series are calculated based on the mean of the predictions from the different decision trees.

The following is an example and non-limiting method of training a set of Random Forest models. A best trained Random Forest ML model is selected, from a set of models resulting from the training phase, to be the basis for instances of a trained ML model. In some embodiments, training data is pre-processed prior to labeling the training data that will be used to train the Random Forest ML model. The preprocessing may include cleaning the readings for null values, normalizing the data, downsampling the features, etc.

In an embodiment, hyper-parameter specifications are received for the Random Forest tch ML model to be trained. Without limitation, these hyper-parameters may include values of model parameters such as number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc. The Random Forest ML model is trained using the specified hyper-parameters and the training data set (or the preprocessed sequence training data, if applicable). The trained model is evaluated using the test and validation data sets, as described above.

According to embodiments, a determination is made of whether to generate another set of hyper-parameter specifications. If so, another set of hyper-parameter specifications is generated and another Random Forest ML model is trained having the new set of hypermeters specified. All Random Forest ML models trained during this training phase are the set of models from which the best trained ML model is chosen.

Hardware Overview

Training data sets 122 and 126 may reside in volatile and/or non-volatile storage, including persistent storage 120 or flash memory, or volatile memory of computing device 100. Additionally, or alternatively, one or both of training data sets 122 and 126 may be stored, at least in part, in main memory of a database server computing device.

An application, such as SEA 110, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

One or more of the functions attributed to any process described herein, may be performed any other logical entity that may or may not be depicted in FIG. 1, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
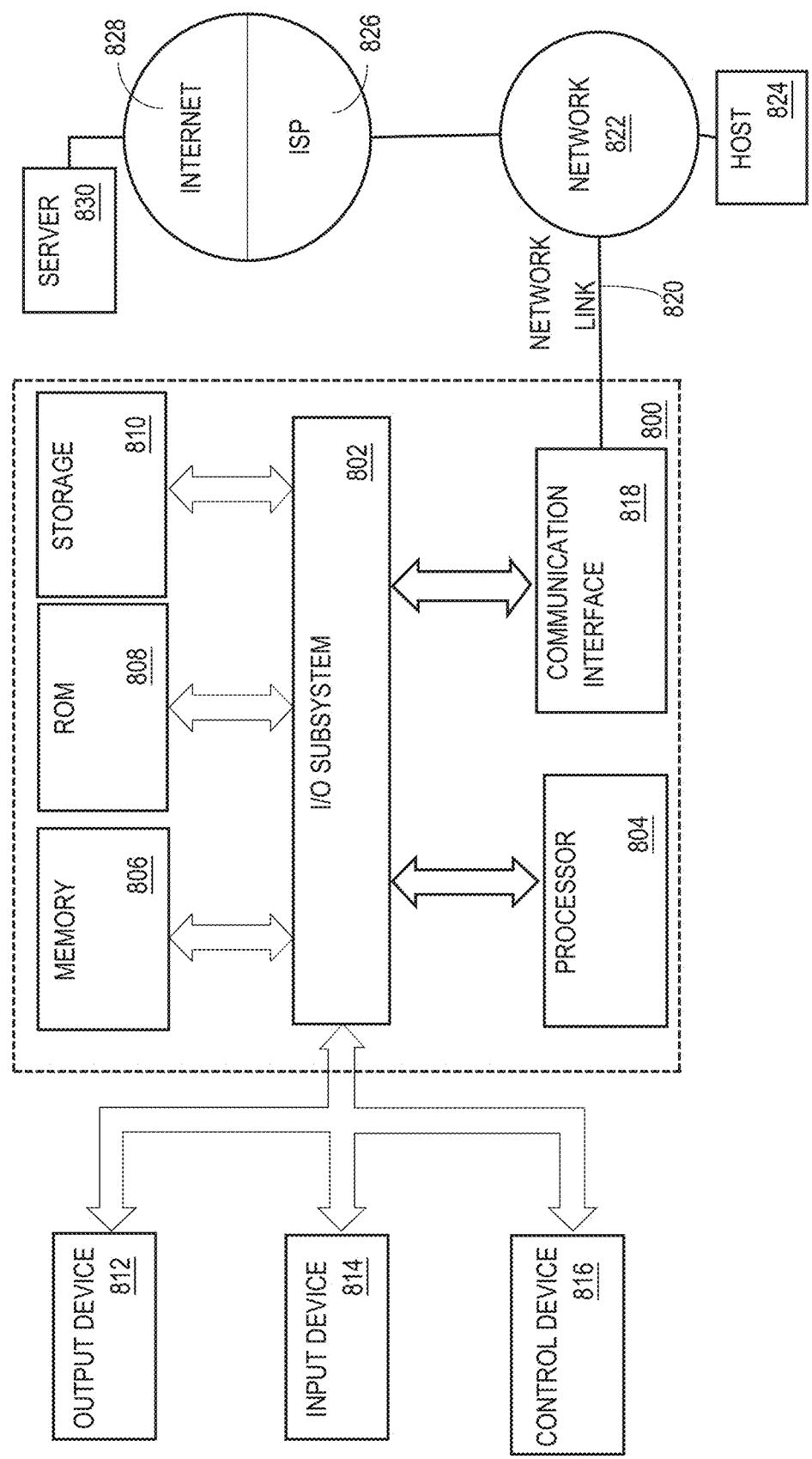
FIG. 8 is a block diagram that illustrates a computer system upon which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
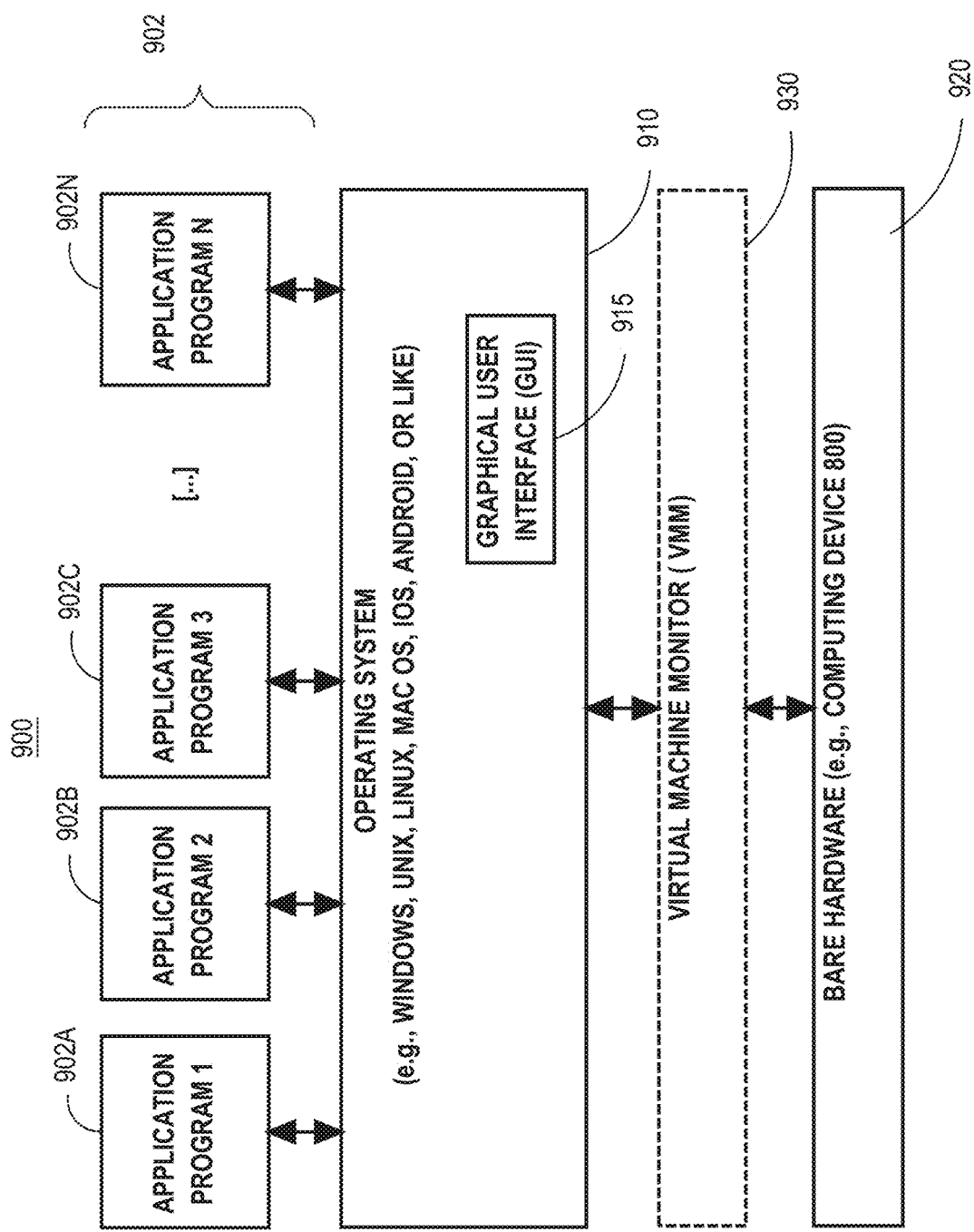
FIG. 9 is a block diagram of a basic software system that may be employed for controlling the operation of a computer system.

FIG. 9 is a block diagram of a basic software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine data samples ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some data samples, the VMM 930 may allow a guest operating system to run as if it is running on the bare hardware 920 of computer system 800 directly. In these data samples, the same version of the guest operating system configured to execute on the bare hardware 920 directly may also execute on VMM 930 without modification or reconfiguration. In other words, VMM 930 may provide full hardware and CPU virtualization to a guest operating system in some data samples.

In other data samples, a guest operating system may be specially designed or configured to execute on VMM 930 for efficiency. In these data samples, the guest operating system is "aware" that it executes on a virtual machine monitor. In other words, VMM 930 may provide para-virtualization to a guest operating system in some data samples.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method for explaining a particular prediction by a trained black-box machine-learning (ML) model for a particular input data sample, comprising:
   identifying a surrogate model training data set;
   wherein identifying the surrogate model training data set comprises:
      determining a radius of a hypersphere in a data sample feature space,
      using the hypersphere to select a plurality of persistent data samples in a training data set that was used to train the trained black-box ML model,
      wherein a first prediction, by the trained black-box ML model, for a first data sample of the plurality of persistent data samples differs, by at least a threshold amount, from a second prediction, by the trained black-box ML model, for a second data sample of the plurality of the persistent data samples,
      generating one or more generated data samples that fall within the hypersphere by perturbing feature values of the persistent data samples, and
      including, in the surrogate model training data set, the one or more generated data samples;
   training a surrogate ML model based on the surrogate model training data set to produce a trained surrogate ML model; and
   based on the trained surrogate ML model, generating explanation information for the particular prediction predicted by the trained black-box ML model;
   wherein the method is performed by one or more computing devices.

2. The computer-executed method of claim 1, further comprising including, in the surrogate model training data set, the plurality of persistent data samples.

3. The computer-executed method of claim 1, wherein generating the one or more generated data samples comprises, for each generated data sample of the one or more generated data samples, identifying a value of a numerical feature, of said each generated data sample, by randomly drawing, from a distribution of values of the numerical feature occurring in the plurality of persistent data samples, a randomly-drawn numerical feature value.

4. The computer-executed method of claim 1, wherein generating the one or more generated data samples comprises, for each generated data sample of the one or more generated data samples, identifying a value of a categorical feature, of said each generated data sample, by identifying a value, from a plurality of potential values for the categorical feature, based on frequencies of the potential values, of the plurality of potential values, occurring in the plurality of persistent data samples.

5. The computer-executed method of claim 1, wherein generating the one or more generated data samples comprises:
   randomly drawing one or more data samples from a portion of the data sample feature space defined by the hypersphere;
   wherein the feature values of the one or more randomly-drawn data samples comprise minor perturbations of feature values in the portion of the data sample feature space defined by the hypersphere.

6. The computer-executed method of claim 1, wherein the explanation information comprises, for each feature of one or more features of the particular input data sample, an impact metric indicating an impact of said each feature on the particular prediction predicted by the trained black-box ML model.

7. The computer-executed method of claim 1, wherein the hypersphere is centered on the particular input data sample in the data sample feature space.

8. The computer-executed method of claim 1, wherein determining the radius of the hypersphere comprises:
   initializing a test radius to be an initial value;
   performing a first hypersphere test on the test radius by:
      generating a set of test data samples within a test hypersphere that is defined by the test radius,
      producing predictions for the set of test data samples using the trained black-box ML model, and
      determining whether one or more test predictions, of the test predictions, are different than the particular prediction by at least the threshold amount;
   responsive to determining that one or more test predictions are different than the particular prediction by at least the threshold amount, determining the radius of the hypersphere based, at least in part, on the test radius; and
   responsive to determining that none of the test predictions are different than the particular prediction by at least the threshold amount:
      incrementally increasing the test radius, and
      performing a second hypersphere test on the increased test radius.

9. The computer-executed method of claim 8, wherein determining the radius of the hypersphere based, at least in part, on the test radius comprises determining the radius of the hypersphere by increasing the test radius by a predetermined amount.

10. The computer-executed method of claim 1, further comprising:
    prior to training the surrogate ML model based on the surrogate model training data set, weighting each data sample of a set of data samples in the surrogate model training data set based on a frequency of said each data sample being in the same leaf node, of a trained random forest ML model, as the particular input data sample;
    wherein the trained random forest ML model is trained using a particular set of training data used to train the trained black-box ML model.

11. The computer-executed method of claim 1, further comprising explaining a third prediction by the trained black-box ML model for a second input data sample by:
    determining that the second input data sample falls within the hypersphere and that the third prediction is within a threshold amount of the particular prediction; and
    in response to determining that the second input data sample falls within the hypersphere and that the third prediction is within a threshold amount of the particular prediction, identifying, for each feature of second one or more features of the second input data sample, based on the trained surrogate ML model, an impact metric indicating an impact of said each feature on the third prediction.

12. The computer-executed method of claim 1, wherein a feature value in a generated data sample of the one or more generated data samples is based on a square root of a count of features in the data sample feature space.

13. One or more non-transitory computer-readable media storing one or more sequences of instructions that, when executed by one or more processors, cause explaining a particular prediction by a trained black-box machine-learning (ML) model for a particular input data sample, comprising:
    identifying a surrogate model training data set;
    wherein identifying the surrogate model training data set comprises:
       determining a radius of a hypersphere in a data sample feature space,
       using the hypersphere to select a plurality of persistent data samples in a training data set that was used to train the trained black-box ML model,
       wherein a first prediction, by the trained black-box ML model, for a first data sample of the plurality of persistent data samples differs, by at least a threshold amount, from a second prediction, by the trained black-box ML model, for a second data sample of the plurality of the persistent data samples,
       generating one or more generated data samples that fall within the hypersphere by perturbing feature values of the persistent data samples, and
       including, in the surrogate model training data set, the one or more generated data samples;
    training a surrogate ML model based on the surrogate model training data set to produce a trained surrogate ML model; and
    based on the trained surrogate ML model, generating explanation information for the particular prediction predicted by the trained black-box ML model.

14. The one or more non-transitory computer-readable media of claim 13, wherein the one or more sequences of instructions comprise instructions that, when executed by one or more processors, cause including, in the surrogate model training data set, the plurality of persistent data samples.

15. The one or more non-transitory computer-readable media of claim 13, wherein generating the one or more generated data samples comprises, for each generated data sample of the one or more generated data samples, identifying a value of a numerical feature, of said each generated data sample, by randomly drawing, from a distribution of values of the numerical feature occurring in the plurality of persistent data samples, a randomly-drawn numerical feature value.

16. The one or more non-transitory computer-readable media of claim 13, wherein generating the one or more generated data samples comprises, for each generated data sample of the one or more generated data samples, identifying a value of a categorical feature, of said each generated data sample, by identifying a value, from a plurality of potential values for the categorical feature, based on frequencies of the potential values, of the plurality of potential values, occurring in the plurality of persistent data samples.

17. The one or more non-transitory computer-readable media of claim 13, wherein generating the one or more generated data samples comprises:
  randomly drawing one or more data samples from a portion of the data sample feature space defined by the hypersphere;
  wherein the feature values of the one or more randomly-drawn data samples comprise minor perturbations of feature values in the portion of the data sample feature space defined by the hypersphere.

18. The one or more non-transitory computer-readable media of claim 13, wherein the explanation information comprises, for each feature of one or more features of the particular input data sample, an impact metric indicating an impact of said each feature on the particular prediction predicted by the trained black-box ML model.

19. The one or more non-transitory computer-readable media of claim 13, wherein the hypersphere is centered on the particular input data sample in the data sample feature space.

20. The one or more non-transitory computer-readable media of claim 13, wherein determining the radius of the hypersphere comprises:
  initializing a test radius to be an initial value;
  performing a first hypersphere test on the test radius by:
    generating a set of test data samples within a test hypersphere that is defined by the test radius,
    producing predictions for the set of test data samples using the trained black-box ML model, and
    determining whether one or more test predictions, of the test predictions, are different than the particular prediction by at least the threshold amount;
  responsive to determining that one or more test predictions are different than the particular prediction by at least the threshold amount, determining the radius of the hypersphere based, at least in part, on the test radius; and
  responsive to determining that none of the test predictions are different than the particular prediction by at least the threshold amount:
    incrementally increasing the test radius, and
    performing a second hypersphere test on the increased test radius.

21. The one or more non-transitory computer-readable media of claim 20, wherein determining the radius of the hypersphere based, at least in part, on the test radius comprises determining the radius of the hypersphere by increasing the test radius by a predetermined amount.

22. The one or more non-transitory computer-readable media of claim 13, wherein the one or more sequences of instructions comprise instructions that, when executed by one or more processors, cause:
  prior to training the surrogate ML model based on the surrogate model training data set, weighting each data sample of a set of data samples in the surrogate model training data set based on a frequency of said each data sample being in the same leaf node, of a trained random forest ML model, as the particular input data sample;
  wherein the trained random forest ML model is trained using a particular set of training data used to train the trained black-box ML model.

23. The one or more non-transitory computer-readable media of claim 13, wherein the one or more sequences of instructions comprise instructions that, when executed by one or more processors, cause explaining a third prediction by the trained black-box ML model for a second input data sample by:
  determining that the second input data sample falls within the hypersphere and that the third prediction is within a threshold amount of the particular prediction; and
  in response to determining that the second input data sample falls within the hypersphere and that the third prediction is within a threshold amount of the particular prediction, identifying, for each feature of second one or more features of the second input data sample, based on the trained surrogate ML model, an impact metric indicating an impact of said each feature on the third prediction.

24. The one or more non-transitory computer-readable media of claim 13, wherein a feature value in a generated data sample of the one or more generated data samples is based on a square root of a count of features in the data sample feature space.

* * * * *